US009741258B1

(12) United States Patent
Chetlur et al.

(10) Patent No.: US 9,741,258 B1
(45) Date of Patent: Aug. 22, 2017

(54) CONDITIONAL PROVISIONING OF AUXILIARY INFORMATION WITH A MEDIA PRESENTATION

(71) Applicant: International Business Machines Corporation, Armonk, NY (US)

(72) Inventors: Malolan Chetlur, Bangalore (IN); Vijay Ekambaram, Chennai (IN); Vikas V. Joshi, Bangalore (IN); Ashok Pon Kumar Sree Prakash, Bangalore (IN); Sharad Sundararajan, Weehawken, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/208,690

(22) Filed: Jul. 13, 2016

(51) Int. Cl.
*H04N 21/442* (2011.01)
*G09B 5/12* (2006.01)
*G06K 9/00* (2006.01)
*G10L 15/22* (2006.01)
*H04N 21/45* (2011.01)
(Continued)

(52) U.S. Cl.
CPC ........... *G09B 5/12* (2013.01); *G06K 9/00315* (2013.01); *G10L 15/22* (2013.01); *H04N 21/2668* (2013.01); *H04N 21/44218* (2013.01); *H04N 21/4532* (2013.01); *H04N 21/8133* (2013.01)

(58) Field of Classification Search
CPC .............................................. H04N 21/44204
See application file for complete search history.

(56) References Cited

U.S. PATENT DOCUMENTS

| 6,973,428 B2 | 12/2005 | Boguraev et al. |
| 8,639,072 B2 | 1/2014 | Popovich et al. |
| 8,666,961 B1 | 3/2014 | Qureshi et al. |

(Continued)

FOREIGN PATENT DOCUMENTS

| CN | 201499247 U | 6/2010 |
| CN | 201523392 U | 7/2010 |

(Continued)

OTHER PUBLICATIONS

List of IBM Patents or Applications Treated as Related, Jul. 13, 2016, 2 pages.

*Primary Examiner* — Hunter B Lonsberry
(74) *Attorney, Agent, or Firm* — Amin, Turocy & Watson, LLP

(57) ABSTRACT

Techniques for conditional presentation of auxiliary information are provided. In one example, a computer-implemented method comprises determining, by a device operatively coupled to a processor, feedback information for a user in response to a media presentation, wherein the feedback information is indicative of a mental state of the user during presentation of the media presentation. The computer-implemented method can further comprise determining content of the media presentation associated with the mental state of the user, and determining auxiliary information about the content based on the mental state of the user. The computer-implemented method can further comprise providing, by the device, the content to a user device during the presentation of the media presentation and for rendering at the user device in association with presentation of the content.

20 Claims, 13 Drawing Sheets

(51) Int. Cl.
*H04N 21/2668* (2011.01)
*H04N 21/81* (2011.01)

(56) References Cited

U.S. PATENT DOCUMENTS

| | | | |
|---|---|---|---|
| 2005/0078968 A1* | 4/2005 | Ohta | G03G 15/5016 |
| | | | 399/8 |
| 2009/0213572 A1 | 8/2009 | Benson et al. | |
| 2013/0246049 A1 | 9/2013 | Mirhaji | |
| 2013/0293577 A1 | 11/2013 | Perez et al. | |
| 2014/0237495 A1* | 8/2014 | Jang | H04N 21/44218 |
| | | | 725/12 |
| 2015/0279426 A1 | 10/2015 | Maurer et al. | |
| 2016/0217321 A1* | 7/2016 | Gottlieb | G06K 9/00771 |

FOREIGN PATENT DOCUMENTS

| | | |
|---|---|---|
| CN | 203084971 U | 7/2013 |
| EP | 1538535 A3 | 6/2005 |
| WO | 2009101954 A1 | 8/2009 |

* cited by examiner

Auxiliary Information Index Presentation — "Ionic Bonding"

| Topic | Slide # | Keywords | Clarifying Version 1 | Clarifying Version 2 | Supplementary Version 1 | Supplementary Version 2 |
|---|---|---|---|---|---|---|
| Topic 1 | 1 | Ionic bonds, metal, nonmetal | C-101 | C-102 | S-101 | S-102 |
| Topic 2 | 1 | formation, neutral atoms | C-103 | C-104 | S-103 | S-104 |
| Topic 3 | 2 | ion, number, electrons | C-105 | C-106 | S-105 | S-106 |
| Topic 4 | 2 | lose, positive, cations | C-107 | C-108 | S-107 | S-108 |
| Topic 5 | 3 | negative, anions | C-109 | C-110 | S-109 | S-110 |
| Topic 6 | 3 | sodium, magnesium | C-112 | C-113 | S-112 | S-113 |
| Topic 7 | 4 | polyatomic ions | C-114 | C-115 | S-114 | S-115 |
| Topic 8 | 5 | properties, crystalline, rigid | C-116 | C-117 | S-116 | S-117 |
| Topic 9 | 6 | conducting, electricity | C-118 | C-119 | S-118 | S-119 |
| Topic 10 | 7 | solids, brittle, repulsion | C-120 | C-121 | S-120 | S-121 |

FIG. 2

CONDITIONAL PROVISIONING OF AUXILIARY INFORMATION WITH A MEDIA PRESENTATION

BACKGROUND

The subject disclosure relates to conditional provisioning of auxiliary information with a media presentation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, systems, computer-implemented methods, apparatus and/or computer program products that facilitate conditional provisioning of auxiliary information with a media presentation are described.

According to an embodiment, a system is provided that can comprise a memory that stores computer-executable components and a processor that executes computer-executable components stored in the memory. In one or more implementations, the computer-executable components comprise a feedback component that receives feedback information indicative of a mental state of a user during presentation of a media presentation. The computer-executable components can further comprise an analysis component that determines content of the media presentation associated with the mental state of the user. The computer-executable components can further comprise auxiliary information component that determines auxiliary information associated with the content based on the mental state of the user for rendering at a user device in association with the presentation of the media presentation.

In another embodiment, a device is provided that can comprise a memory that stores computer-executable components and a processor that executes computer-executable components stored in the memory. In one or more implementations, the computer-executable components can comprise a feedback component that receives feedback information for a user during a media presentation and regarding a mental state of the user during the media presentation. The computer-executable components can further comprise a communication component that receives auxiliary information about a portion of content of the media presentation associated with reception of the feedback information. The computer-executable components can further comprise a rendering component that renders the auxiliary information on a display of the device during the media presentation and based on the portion of the content.

According to another embodiment, a computer-implemented method is provided. In one example, the computer-implemented method comprises determining, by a device operatively coupled to a processor, feedback information for a user in response to a media presentation, wherein the feedback information is indicative of a mental state of the user during presentation of the media presentation at a user device associated with the user. The computer-implemented method can further comprise determining, by the device, content of the media presentation associated with the mental state of the user, and determining, by the device, auxiliary information about the content based on the mental state of the user. The computer-implemented method can further comprise providing, by the device, the auxiliary information to the user device during the presentation of the media presentation and for rendering at the user device in association with presentation of the content.

DESCRIPTION OF THE DRAWINGS

FIG. 2 presents a table of an example, non-limiting auxiliary information index in accordance with one or more embodiments described herein.

DETAILED DESCRIPTION

Figure 1:
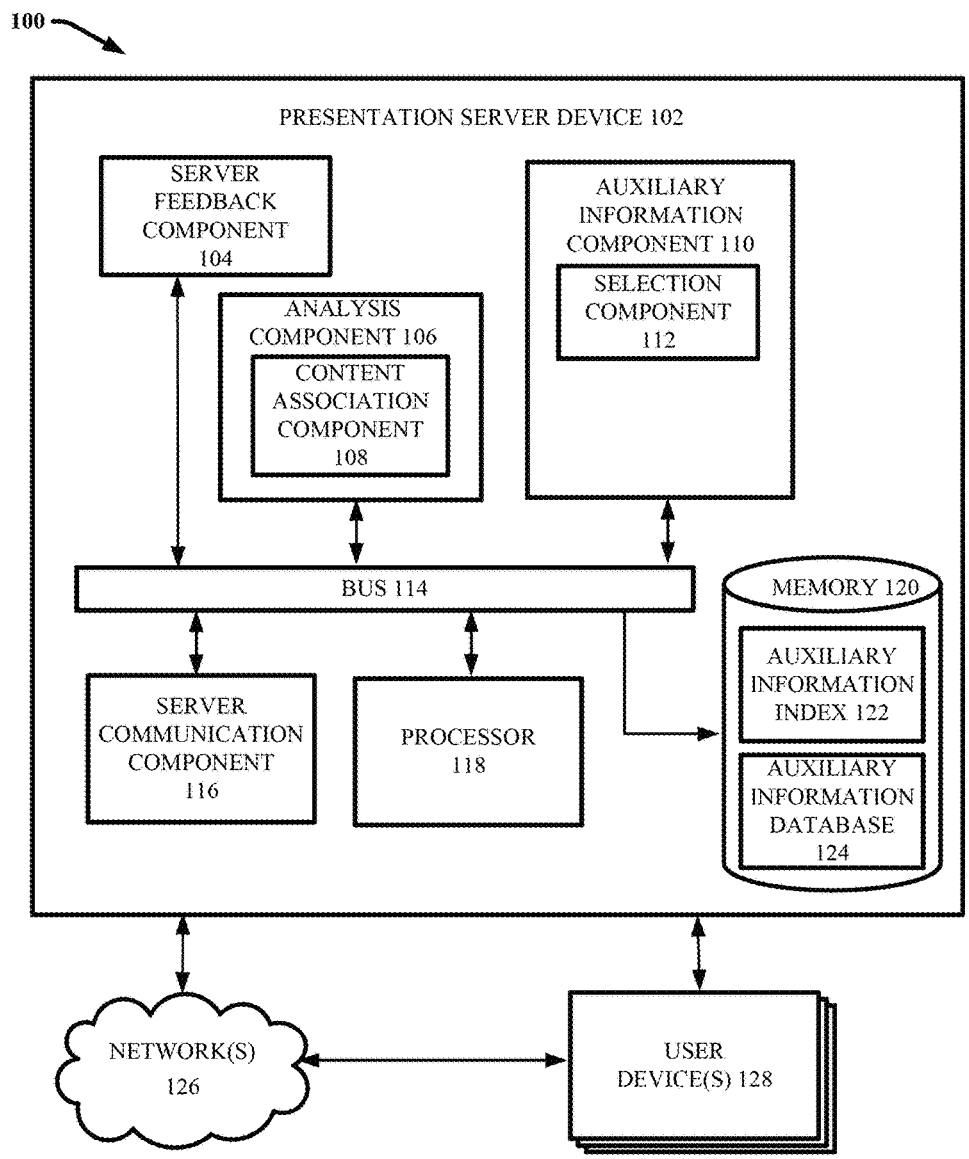
FIG. 1 illustrates a block diagram of an example, non-limiting system that facilitates conditional provisioning of auxiliary information with a media presentation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to computer processing systems, computer-implemented methods, apparatus and/or computer program products that facilitate providing auxiliary information associated with a presentation to a user device for a user that is viewing, listening to, or otherwise receiving the presentation. The auxiliary information can be based on feedback provided by the user during the presentation indicating a need or desire for the auxiliary information. The presentation can include for example, a live or recorded educational, informative, or instructional presentation in which one or more presenters speak about a particular subject and/or provide a visual demonstration related to the subject. For example, a presentation can include a live or recorded lecture presented by a professor to a group of students about atomic bonding while presenting and discussing a previously prepared slideshow on atomic bonding. In another example, a presentation can include a live or recorded audible description of different art included in a museum in association with a walking tour through the museum.

In particular, as a user is viewing, listening to or otherwise receiving a presentation, depending on the nature of the presentation, the user may be interested in or intrigued by certain parts of the presentation, confused by certain parts of the presentation, bored with certain parts of the presentation, etc. When the presentation is experienced in a live environment, especially in a group setting, the user may be unable or too shy to ask the presenter questions associated with parts of the presentation the user finds interesting or confusing. Similarly, the user may be unable or too shy to inform the presenter that the user considers certain subject matter boring, not useful or otherwise not engaging in contexts in which the user or the presenter could elect to change the content or a part of the content of the presentation to different content the user would likely find more interesting, useful or engaging. Likewise, when experiencing a presentation in a non-live context, such as watching a video of a presentation, listening to an audio recording of a presentation, or viewing a slideshow, the user may see content the user finds interesting, confusing, boring, etc. However, the user may not be inclined or able to stop the presentation and look up additional information (e.g., via searching sources on the Internet) or change the presentation (e.g., stop the presentation entirely, skip over content etc.).

In accordance with one or more embodiments, the subject computer processing systems, computer-implemented methods, apparatus and/or computer program products facilitate automatically (e.g., without direct human involvement) providing auxiliary information to a user device for a user viewing, listening to, or otherwise experiencing a presentation and based on feedback received from the user during the presentation indicating a mental state of the user during the presentation. In particular, techniques are provided for automatically detecting a mental state of a user during a presentation and correlating the mental state with a particular part of the presentation. For example, in some implementations, the mental state of a user can be detected based on facial expressions exhibited by the user during the presentation that indicate the user is confused, interested, bored, etc. In one embodiment, the facial expressions are captured and/or detected via a heads-up display (HUD) device worn by the user or another device associated with the user. In some embodiments, a user can also provide, via the user device, an explicit request for auxiliary information related to a part of a presentation the user is confused about, interested in, bored with, etc. while the user is experiencing the presentation. In another embodiment, the user can provide explicit input that states the user is confused, interested, bored etc. via the user device in association with presentation of a particular part of a presentation.

In various implementations, a presentation system can receive the feedback and access information previously associating known parts of the presentation with auxiliary information, such as clarifying information intended to clarify user confusion about a particular part of the presentation or supplementary information intended to provide additional detailed examples about a particular part of the presentation for users that express interest in that particular part of the presentation. The system can further retrieve the auxiliary information and provide it to the user device of the user for displaying at the user device, playing at the user device, or otherwise rendering at the user device. In one embodiment, the auxiliary information can be provided to the user device and presented at the user device in real-time such that the auxiliary information is presented during presentation of the particular part of the presentation associated with the cause of the user mental state. For example, in response to reception of feedback indicating a user is confused about topic 2 of a presentation, clarifying information about topic 2 can automatically be provided to the user device and rendered or displayed at the user device (e.g., a HUD device, a tablet, a smartphone, a laptop computer, a desktop computer etc.). In another embodiment, the auxiliary information can be provided to the user after the presentation is completed or during a break period in the presentation.

In some implementations, different versions of the auxiliary information can be available that are tailored to different user traits or preferences, such as different learning styles, educational levels, intellectual levels or abilities, reading levels, etc. The different versions can vary in the type of content of the auxiliary information, which can include, but is not limited to, text, images, video, audio and hyperlinks. The different versions can also vary with respect to an amount of content, a degree of complexity of the content, an intellectual level associated with the content, and the like. According to these embodiments, in addition to selecting auxiliary information related to a mental state of the user, a particular version of the auxiliary information can be selected based on a trait or preference of the user.

The various features and functionalities of one or more of the implementations of the disclosed computer processing systems, computer-implemented methods, apparatus and/or computer program products can allow users to experience a presentation in a live or non-live setting and automatically receive auxiliary information when desired or needed as determined based on implicit (e.g., a determined mental state) or explicit (e.g., a direct request for the auxiliary information) feedback obtained via the user device during the presentation. Accordingly, a plurality of users can view or experience the same presentation in a live or non-live setting and receive different auxiliary information at different times during the presentation based on their individual responses to different parts of the presentation and/or their individual traits and preferences. Therefore, a same presentation can be tailored to the needs and preferences of different users in real-time as the respective users experience the presentation, thus enabling each user to experience the presentation in a more fulfilling and enjoyable manner. Further, in a live setting, different users can be provided with clarifying information, supplementary information, attention information, etc. without asking the presenter questions that the user may be too shy to ask or that may not be relevant to other users experiencing the presentation. As a result, the presenter can more efficiently and effectively provide the presentation to all users without stopping the presentation to answer questions.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting system 100 that facilitates conditional provisioning of auxiliary information with a media presentation in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The system 100 and/or the components of the system 100 can provide substantial improvements to live and Internet based learning systems by automatically providing users with auxiliary information related to a presentation in real-time or substantially real-time based on the users' mental and emotional states and/or preferences. Accordingly, a plurality of users can view or experience the same presentation in a live or non-live setting and receive different auxiliary information at different times during the presentation based on their individual responses to different parts of the presentation and/or their individual traits and preferences. Therefore, a same presentation can be dynamically and automatically tailored to the needs and preferences of different users in real-time as the respective users experience the presentation, thus enabling each user to experience the presentation in a more fulfilling and enjoyable manner. Further, in a live setting, auxiliary information can be presented to a user in a HUD as the user is watching, listening to or otherwise experiencing the presentation, thereby minimizing distraction associated with consuming the auxiliary information during the presentation.

The system 100 and/or the components of the system 100 can be employed to use hardware and/or software to solve problems that are highly technical in nature, that are not abstract and that cannot be performed as a set of mental acts by a human. For example, system 100 and/or the components of the system 100 can be employed to use hardware and/or software to perform operations including affective computing related to automatically detecting and recognizing emotional information, correlating the emotional information with presentation content associated with causation of a specific mental state, and automatically selecting and providing auxiliary information for the presentation content. Further, some of the processes performed may be performed by specialized computers for carrying out defined tasks related to the performing affective computing to facilitate automatic provision of auxiliary content to users based on emotional state. System 100 and/or components of the system 100 can be employed to solve new problems that arise through advancements in technology, computer networks, the Internet and the like. System 100 can further provide technical improvements to live and Internet based learning systems by improving processing efficiency among processing components associated with selecting and providing auxiliary information associated with a presentation in real-time based a user's current mental state and preferences.

As shown in FIG. 1, system 100 can include a presentation server device 102, one or more networks 126 and one or more user devices 128. The presentation server device 102 can include various computer-executable components, including, but not limited to, server feedback component 104, analysis component 106, auxiliary information component 110 and server communication component 116. The presentation server device 102 can also include or otherwise be associated with at least one memory 120 that stores computer-executable components (e.g., the server feedback component 104, the analysis component 106, the auxiliary information component 110, and the server communication component 116). The presentation server device 102 can also include or otherwise be associated with at least one processor 118 that executes the computer-executable components stored in the memory 120. The presentation server device 102 can further include a system bus 114 that can couple the various components including, but not limited to, the server feedback component 104, the analysis component 106, the auxiliary information component 110, the server communication component 116, memory 120 and/or processor 118.

In various embodiments, the presentation server device 102 and the one or more user devices 128 can operate in a server/client relationship wherein auxiliary information associated with a presentation is provided by the presentation server device 102 to the one or more user devices 128 based on processing, by the presentation server device 102 and/or the one or more user devices 128, of feedback information regarding the need or desire for the auxiliary information by respective users associated with the one or more user devices 128.

In some implementations, the presentation server device 102 and the one or more user devices 128 can be communicatively coupled via one or more networks 126. Such networks 126 can include wired and wireless networks, including, but not limited to, a cellular network, a wide area network (WAN) (e.g., the Internet) or a local area network (LAN). For example, the one or more user devices 128 can communicate with presentation server device 102 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (Wi-MAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, and/or an ultra-wideband (UWB) standard protocol.

For example, in one embodiment, one or more user devices 128 can be respectively associated with students located in relatively close proximity to the presentation server device 102 (e.g., within the same physical classroom space). According to this embodiment, the one or more user devices 128 and the presentation server device 102 can be communicatively coupled via an area network (e.g., LAN). In another embodiment, the one or more user devices 128 can be respectively associated with students located in disparate remote physical locations relative to the presentation server device 102. According to this embodiment, the one or more user devices 128 and the presentation server device 102 can be communicatively coupled via a WAN (e.g., a cellular network, the Internet, etc.). In an aspect, one or more components of system 100 can interact via disparate networks.

The presentation server device 102 can include server communication component 116 to facilitate wireless communication between the presentation server device 102 and the one or more user devices 128, and between the presentation server device 102 and one or more other external devices (not shown). For example, the server communication component 116 can receive feedback information from one or more user devices 128 and/or one or more other devices (e.g., a remote camera, sensors worn by the user, etc.) and forward the feedback information to the server feedback component 104 for processing. The server communication component 116 can also send auxiliary information to the one or more user devices 128 for rendering at the respective user devices in association with viewing, listening to, or otherwise experiencing a presentation. In some embodiments, the server communication component 116 can also send presentation data to the one or more user devices. For example, the server communication component 116 can send slides included in a slideshow component of a presentation for rendering at the respective user devices. In another example in which the presentation includes a video, the server communication component 116 can send the video to the respective user devices. In yet another example in which the presentation includes an audio recording, the server communication component 116 can send the audio recording to the respective devices. The server communication component 116 can be or include hardware (e.g., a central processing unit (CPU), a transceiver, a decoder), software (e.g., a set of threads, a set of processes, software in execution) or a combination of hardware and software that facilitates communicating information between the presentation server device 102 and the one or more user devices 128.

Although in system 100 various components (e.g., the server feedback component 104, the analysis component 106, the auxiliary information component 110, and the server communication component 116) are provided on a server device (e.g., a presentation server device 102), in other embodiments, any number of different types of devices can be associated with or include the aforementioned components. All such embodiments are envisaged. Further, although in the embodiment shown the server feedback component 104, the analysis component 106, the auxiliary information component 110, and the server communication component 116 are provided at the presentation server device 102, it should be appreciated that the architecture of system 100 is not so limited. For example, one or more of the components included at the presentation server device 102 can be located at another device, such as another server device, an intermediary device between the server device and the one or more user devices 128, or at the one or more user devices 128, etc.

The one or more user devices 128 can include any suitable computing device associated with a user and that can receive and/or render auxiliary information associated with a presentation provided by the presentation server device 102. In some implementations, the one or more user devices 128 can also facilitate capturing feedback information regarding the respective user need or desire for the auxiliary information and providing the feedback information to the presentation server device 102 (e.g., as discussed infra with respect to FIG. 3). For example, the one or more user devices 128 can include a desktop computer, a laptop computer, a television, an Internet enabled television, a mobile phone, a smartphone, a tablet user computer (PC), a digital assistant (PDA), a HUD, a virtual reality (VR) headset, an augmented reality (AR) headset, or another type of wearable computing device. As used in this disclosure, the terms "user," "student," "presenter," and the like refer to a person, entity, system, or combination thereof that can employ system 100 (or additional systems described in this disclosure) using a user device of the one or more user devices 128 or the presentation server device 102.

The presentation server device 102 can facilitate conditional provisioning of auxiliary information with a media presentation. The term "media presentation" is used herein to describe a live or recorded (e.g., an audio recording, a video recording, or a video recording including audio) presentation that includes a visual component, an audio component, or both a visual and an audio component. In various implementations, the media presentation can be educational, informative or instructive in nature. For example, a media presentation can include a live or recorded lecture presented by a teacher to group of students. In some implementations, the live or recorded lecture can be presented in association with a slideshow having one or more slides, such as a slideshow presentation created using POWERPOINT® or a similar software application. The information included in the respective slides can include text, charts, images, video, audio, hyperlinks, or the like. In another example, a media presentation can include a live or recorded demonstration performed by one or more people. For instance, a media presentation can include a live or recorded presentation of an experiment (e.g., a laboratory experiment), a procedure (e.g., a surgical procedure), or an activity (e.g., cooking, snowboarding). In another example, a media presentation can include a live or recorded presentation in which one or more presenters describe and/or demonstrate how to do an activity (e.g., a "how-to" video). In yet another example, a media presentation can include a live or recorded presentation in which a tour guide walks through a museum and provides informative information about different art in the museum. Still in another example, a media presentation can include an audio recording of the tour through the museum. According to this example, the audio recording can be listened to by museum visitors using headphones associated via a wearable device as they walk through the museum and auxiliary information can be rendered via the wearable device based on feedback received from the respective visitors in association with presentation of the audio recording.

In order to facilitate providing auxiliary information about a media presentation to a user device for a user viewing, listening to or otherwise watching the presentation at the user device (e.g., of the one or more user devices 128), the server feedback component 104 can receive feedback information for the user during the presentation regarding the user need or desire for the auxiliary information. In one or more embodiments, this feedback information can include information regarding one or more mental states of the user during review of the presentation. For example, the server feedback component 104 can receive feedback information that indicates the user is intrigued or particularly interested, that the user is confused, that the user is bored or unengaged, that the user is amused, that the user is excited, that the user is concerned or worried, that the user is offended, etc. Based on the determined mental state of the user during a presentation, the auxiliary information component 110 can determine whether the user needs or desires auxiliary information for a particular part of the presentation associated with the cause of the mental state. For example, based on a determination that the user is confused in association with presentation of particular topic of a presentation, the auxiliary information component 110 can determine clarifying auxiliary information to provide to the user at the user device and that is intended to ease the user confusion on the topic. In some implementations, the server communication component 116 can further provide the auxiliary information to the user device for rendering in association with the topic of the presentation (e.g., while the topic is being presented or during a break period following presentation of the topic).

In some implementations, feedback regarding a mental state of the user can be based on one or more facial expressions expressed by the user during the presentation. For example, system 100 can employ various existing emotion recognition technologies that can determine a user mental or emotional state based on analysis of facial expressions and eye movement of the user captured in video and one or more images of the user. With facial emotion detection, algorithms can detect faces within a photo or video, and sense micro expressions by analyzing the relationship between points on the face, based on curated databases compiled in academic environments. According to these implementations, as a user is viewing, listening to, or otherwise experiencing a presentation, facial expressions and/or eye movements of the user can be captured and/or detected via one or more user facing cameras. For example, in some embodiments, the user can wear a HUD device including a user facing camera or image sensor that can capture facial expressions and/or eye movements of the user during a presentation. In another example, a user facing camera can be included on a device such as a tablet, smartphone, desktop or laptop computer employed by the user and capture facial expressions and/or eye movements of the user during a presentation. In another example, an external user facing camera can be included in a same room as the user or a group of users and capture facial expressions and/or eye movements of the respective users. In some embodiments, the user facing camera or cameras can be or be provided at the one or more user devices 128 associated with the respective users at which auxiliary information for the presentation is rendered.

In various embodiments, image data of a user face during a presentation can be captured and processed to determine a mental state of the user in real-time or substantially real-time. As used herein, the term "real-time" can mean processing and capturing to determine the mental state within a defined number of minutes or seconds (e.g., within 10 seconds, within 30 seconds, within 60 seconds, within 2 minutes) after the image data is generated. Accordingly, as the user is viewing, listening to, or otherwise experiencing a presentation, one or more mental states of the user over the course of the presentation can be determined in real-time or substantially real-time. In some embodiments, captured facial expressions and/or eye movements can be processed by the capture device (e.g., a user device of the one or more user devices 128 or another device) that captured the respective facial expressions and/or eye movements to determine a mental or emotional state of the user. The capture device can further send feedback information identifying the determined mental or emotional state of the user to the presentation server device 102 in real-time or substantially real-time. According to these embodiments, the server feedback component 104 can receive information that identifies respective mental states of the user over the course of a presentation in real-time or substantially real-time. For example, in one embodiment, a camera or image sensor can be included at a user device associated with a user (e.g., a user device of the one or more user devices 128). The user device can capture (e.g., via the camera or image sensor) and process facial expressions and/or eye movements of the user during the presentation to determine a mental state of the user (e.g., interested, confused, excited, bored, amused, offended, etc.). The user device can further provide information identifying the mental state of the user to the presentation server device 102 in real-time or substantially real-time (in response to capture and processing). In other embodiments, image data of a user face captured during a presentation (e.g., by a camera or image sensor at the user device or another device) can be sent to the presentation server device 102 by the capture device for processing by the server feedback component 104. For example, a user device (e.g., a HUD device, a tablet, a laptop computer, a desktop computer, etc.) associated with a user experiencing a presentation can capture image data of the user face during the presentation and send the image data (e.g., in real-time or substantially real-time) to the presentation server device 102 for processing by the server feedback component 104. According to these embodiments, the server feedback component 104 can receive image data (e.g., video or still images) captured of a user face during a presentation and process the image data to determine respective mental or emotional states of the user during the presentation in real-time or substantially real-time.

In various additional embodiments, feedback information regarding a mental or emotional state of a user during a presentation can be determined based on analysis of speech spoken by the user during the presentation. According to these embodiments, the user device employed by the user, the presentation server device 102, or another device within audible range of the user can include audio recording hardware and software to record and analyze speech spoken by the user during a presentation. For example, the speech can include a question raised by the user. In another example, the speech can include dialogue between the user and the presenter or between the user and another user. In some implementations, analysis of the speech can include analysis of tone and word content using one or more sonic algorithms to determine a mental or emotional state of the user during the presentation. Similar to the image data, the server feedback component 104 can receive processed speech data from the capture device associated with capture of the motion data (e.g., the user device of the one or more user devices 128, the presentation server device 102, or another device) identifying a mental or emotional state of the user based on the speech data, and/or receive raw speech data from the capture device for processing by the server feedback component 104 to determine the mental or emotional state associated with the speech data.

In another embodiment, feedback information regarding a mental or emotional state of a user during a presentation can be determined based on analysis of body movement or gestures of the user during the presentation. For example, motion information regarding movement and motion of the user during a presentation can be captured and analyzed to identify gestures or body language indicative of different emotional states of the user during the presentation. According to this embodiment, in one aspect, one or more motion sensors can be worn by the user or be included in a device worn by the user (e.g., the user device of the one or more user devices 128 or another device) and capture motion data regarding motion or movement of the user during the presentation (e.g., gestures, fidgeting, remaining relatively still, changing a body position, blinking, foot tapping, etc.). In another expect, information regarding user motion during presentation can be discerned from image data (e.g., video) captured of the user during the presentation. The server feedback component 104 can further receive processed motion data from the capture device associated with capture of the motion data (e.g., a user device of the one or more user devices 128 or another device) identifying a mental or emotional state of the user based on the motion data, and/or receive raw motion data for processing by the server feedback component 104 to determine the mental or emotional state associated with the motion data.

In another embodiment, feedback information regarding a mental or emotional state of a user during a presentation can be determined based on analysis of biometric data captured from the user during the presentation. For example, the biometric information can include, but is not limited to, information regarding the user heart rate, respiratory rate, muscle tension, and hormone levels (e.g., cortisol, oxytocin, acetylcholine, dopamine, serotonin, gaba, glutamine, endorphin, epinephrine, norepinephrine, and glutamate). According to this embodiment, one or more biometric sensors can be worn by the user (e.g., external to the body and/or internal to the body), and/or be included in a device worn by the user (e.g., a user device of the one or more user devices 128 or another device) and biometric data associated with the user during the presentation. The server feedback component 104 can further receive processed biometric data from the capture device associated with capture of the biometric data (e.g., the user device) identifying a mental or emotional state of the user based on the biometric data, and/or receive raw biometric data for processing by the server feedback component 104 to determine the mental or emotional state associated with the biometric data.

In addition to determining a user mental state based on feedback information including one or more facial expressions of the user, speech of the user, motion of the user and/or biometric information of the user received in response to the presentation, the server feedback component 104 can also receive explicit user feedback regarding a user request for auxiliary information associated with a presentation. For example, as the user is viewing, listening to or otherwise experiencing a presentation, the user can provide direct input requesting auxiliary information associated with a presentation that is received by the server feedback component 104. For example, the user device (e.g., a user device of the one or more user devices 128 or another device) can include a suitable input mechanism (e.g., selection of a hard or soft button, a touch screen, a keypad, a keyboard, a mouse, voice input, gesture input, etc.) via which the user can provide direct input indicating a mental state of the user (e.g., input stating or meaning "I'm confused") and/or a type of auxiliary information the user would like to receive (e.g., input stating or meaning "I want clarifying information," "I want supplementary information," etc.). For example, the user can select a button on the user device, provide verbal or textual input, perform a gesture or generate another defined signal that can be received by the server feedback component 104 and indicate the user is confused about a particular part of the presentation and would like to receive clarifying information. Similarly, the user can select a different button on the user device, provide different verbal or textual input, perform a different gesture, or generate a different defined signal that can be received by the server feedback component 104 and indicate the user is interested in a particular part of the presentation and would like to receive clarifying information.

After the server feedback component 104 receives and/or determines feedback regarding a user mental state and/or explicit desire for auxiliary information during a presentation, in one or more embodiments, the analysis component 106 can determine the particular content of the presentation for which the user has indicated desire or need for auxiliary information. In particular, the analysis component 106 can include content association component 108 to correlate feedback indicating a particular mental state of the user (e.g., interested, confused, bored, excited, amuse, not amused, etc.) or desire for auxiliary information with a specific part of the content included in the presentation that is being presented at the time the feedback is received. For instance, in one or more embodiments, the presentation server device 102 can have access to information identifying content included in a presentation (e.g., in memory 120 or at another device). For example, in embodiments in which the presentation is a live presentation, the presentation server device 102 can have access to information that identifies different topics and/or sub-topics included in the presentation and content respectively associated with the different topics and/or sub-topics. In another example in which the presentation includes a live or recorded presentation that includes a slideshow, the presentation server device 102 can have access to information identifying content included in respective slides of the slideshow and/or content associated with different parts or elements of a single slide.

In some embodiments, the content association component 108 can determine a part of the content included in a presentation that is associated with reception of user feedback based on timing of reception of the feedback and a current time point or time frame associated with the presentation. For example, the presentation can include a live or recorded presentation associated with a known duration wherein particular parts or content included in the presentation are associated with known time points or time frames over the duration of the presentation. For example, with respect to a presentation including a plurality of known topics identified as topic 1, topic, 2, topic 3, etc., each (or, in some embodiments, one or more) of the different topics can be associated with known time points or time frames throughout the presentation. Information regarding content respectively associated with different time points or time frames of the presentation can be stored in memory 120 or otherwise accessible to the content association component 108. Accordingly, as a presentation is being presented, the content association component 108 can determine a time point or time frame of the presentation associated with reception of the feedback. For example, in some implementations, the presentation server device 102 can receive information identifying the start time of the presentation and track the presentation time following the start of the presentation. In another example, in implementations in which the presentation includes a video, the presentation server device 102 can receive information identifying a current time in the video when the feedback is received. In some embodiments, the presentation server device 102 can play the video or stream the video to the user's user device and thus correlate received feedback with a current time point or time frame of the video. The content association component 108 can further identify the particular content of the presentation (e.g., topic 1, topic, 2, topic, 3, etc.) associated with that time point or time frame.

In another embodiment in which the presentation includes a slideshow, the content association component 108 can have access to information (e.g., stored in memory 120 or at another device) identifying content of the presentation respectively associated with each slide (or, in some embodiments, one or more slides). The content association component 108 can further determine or receive information identifying a current slide that is being presented during a presentation at a time when the feedback is received. For example, in some embodiments, the presentation server device 102 can provide or render the respective slides and thus have direct knowledge about what slide is currently being presented. In some implementations, the content association component 108 can further have access to information identifying sub-topics or elements in a same slide and determine the particular sub-topic or element of a same slide that is being presented at the time feedback is received. For example, the slides can include interactive slides in which different elements or parts of a single slide can be activated or highlighted. According to this implementation, the content association component 108 can determine the particular sub-topic or element being presented at the time feedback is received based on information indicating a particular part or element of the slide is being pointed to, highlighted, selected or otherwise activated.

Still in other embodiments, the presentation server device 102 can include or have access to information associating known keywords in a presentation with specific parts of the content of the presentation. According to these embodiments, the server feedback component 104 can receive or determine information identifying a known keyword that is spoken during the presentation at a time associated with reception of the feedback. For example, in embodiments in which the presentation server device 102 is located within audible range of the presenter, the content association component 108 can include or employ speech recognition hardware and software to capture speech spoken by the presenter and identify keywords spoken throughout the presentation. The content association component 108 can further determine a keyword (or keywords) spoken at time associated with reception of the feedback and further correlate the feedback with the known part of the content associated with the keyword (or keywords). In some embodiments, the user device associated with the user (e.g., a user device of the one or more user devices 128 or another device) can include the speech recognition hardware and/or software and determine the keyword or keywords being presented at a time when the user generates or provides the feedback regarding the user mental state or explicit need or desire for auxiliary information. According to these embodiments, the user device can include information identifying the keyword or keywords in association with providing the feedback information to the server feedback component 104.

Once the analysis component 106 has determined a particular part of the content included in a presentation associated with received feedback, the auxiliary information component 110 can facilitate selecting auxiliary information for provision to the user at the user device based on the feedback. In particular, in one or more embodiments, the presentation server device 102 can include or have access to defined auxiliary information respectively associated with known parts of the presentation (e.g., topics, subtopic, elements, etc.). For example, the presentation server device 102 can include an auxiliary information database 124 stored in memory 120 (or at another device accessible to the presentation server device 102) including a variety of defined auxiliary information for a presentation. The auxiliary information can include, but is not limited to, text, images, charts, audio, video, and/or hyperlinks that include auxiliary information related to respective parts of the presentation.

In one or more embodiments, various types of auxiliary information can be associated with defined mental states. For example, in some implementations, auxiliary information intended to facilitate helping a user better understand a part of the presentation the user is confused about is referred to herein as "clarifying" auxiliary information. In another example, auxiliary information intended to provide a user more detailed information or examples about a part of the presentation a user is particularly interested in or intrigued by is referred to herein as "supplementary" auxiliary information. In another example, auxiliary information intended to capture a user's attention (e.g., when the user provides feedback indicating the user is bored or uninterested) is referred to herein as "attention" auxiliary information. It should be appreciated that the above described auxiliary information types are merely exemplary and other types of auxiliary information related to different mental states, purposes, and/or content types are also envisioned.

In addition to having different types of auxiliary information for different mental states, in some embodiments, different auxiliary information can also be associated with defined user traits and preferences. For example, in one or more embodiments, the presentation server device 102 can include or have access to user profile information for respective users to which a presentation is presented. The user profile information can include information that identifies or describes a type of auxiliary information the user prefers. For example, in some implementations, the user profile information can indicate whether the user prefers visual auxiliary information or textual auxiliary information. In another example, the user profile information can indicate whether the user prefers complex auxiliary information, simple auxiliary information, short auxiliary information, long auxiliary information, etc. With regard to educational presentations, the user profile information can include, but is not limited to, information regarding a user's intellectual level or capability, grades, learning type (e.g., visual, mathematical, kinesthetic, auditory, etc.), reading level or speed of the user, degree of background knowledge in the presentation subject matter, multitasking ability, and the like. The presentation server device 102 can further determine and tailor traits and preferences for a user over time using machine learning techniques.

Thus in various embodiments, in addition to having different types of auxiliary information for different mental states, different versions of auxiliary information of a same type (e.g., clarifying, supplementary, attention, etc.) can be provided for a same part of content included in a presentation, wherein the different versions are associated with defined user traits and/or preferences. The different versions for example can include different types of content (e.g., text, images or video), different amounts of content, different degrees of content complexity, and the like. For example, a first version of clarifying auxiliary information regarding how two molecules bind can include a visual animation including three-dimensional models of the two molecules demonstrating how they bind, and second version of clarifying auxiliary information regarding how the two molecules bind can include chemical formulas of the two molecules when separated and when combined. According to this example, the first version of the clarifying information may be provided for a visual learner with a basic chemical background while the second version may be provided for mathematical learner with a more complex chemical background. In another example, a first version of supplementary auxiliary content that is intended for presentation to a slow reader can include less text information than a second version of the supplementary auxiliary content that is intended for presentation to a fast reader.

In the embodiment shown, the presentation server device 102 can also include an auxiliary information index 122 stored in the memory 120 (or otherwise accessible to the presentation server device 102). In various implementations, the auxiliary information index 122 can include information that identifies a particular presentation and known content parts (e.g., topics, sub-topics, elements, etc.) of the presentation. In embodiments in which the presentation includes slides, the auxiliary information index 122 can include information identifying respective slides associated with each content part (or, in some embodiments, with one or more content parts). In embodiments in which the presentation includes a video, the auxiliary information index can include information identifying time points or time frames of the video associated with each content part (or, in some embodiments, with one or more content parts). In other embodiment in which the presentation includes speech, the auxiliary information index can include keywords respectively associated with different parts of the presentation. The auxiliary information index 122 can also include information identifying auxiliary information (e.g., included in auxiliary information database 124) respectively associated with each part of the presentation, a type of the auxiliary information, a version of the auxiliary information, and/or a user profile trait or preference associated with the auxiliary information.

For example, FIG. 2 presents a table of an example, non-limiting auxiliary information index 200 in accordance with one or more embodiments described herein. Repetitive description of like embodiments employed in respective embodiments is omitted for sake of brevity.

The auxiliary information index 200 is provided for a presentation titled "Ionic Bonding." In one implementation, the presentation was prepared by a teacher for presenting to a group of students. The presentation includes 10 defined topics associated with seven prepared slides. The auxiliary information index 200 can include information identifying each topic and the respective slides with which each topic is associated. The auxiliary information index 200 can further include keywords associated with each topic (or, in some embodiments, with one or more topics). In some implementations, the keywords can be detected during the presentation in speech spoken during the presentation (e.g., by the presenter) using voice recognition hardware and software (e.g., provided at the user device or the presentation server device 102) to facilitate identifying the current topic being presented. In addition, the auxiliary information index 200 can include information identifying different auxiliary information respectively associated with each topic. In the embodiment shown, each topic has two versions of clarifying information and two versions of supplementary information associated therewith. In this example embodiment, the first versions of the clarifying and supplementary auxiliary information can be intended for provision to students that are visual learners and the second versions of the clarifying and supplementary auxiliary information can be intended for provision to students that are mathematical learners. Each auxiliary information entry is associated with a unique identifier (e.g., C-101, C-103, C-103, S-101, S-102, S-103) to facilitate identifying and retrieving the corresponding auxiliary information in the auxiliary information database 124. For example, in response to a determination that a visual learning student is confused in association with presentation of topic 7, the auxiliary information component 110 can retrieve the auxiliary information associated with identifier C-114.

With reference back to FIG. 1, the auxiliary information component 110 can include selection component 112 to facilitate selecting auxiliary information to provide to a user at the user's user device based on received feedback for the user during a presentation. In one or more embodiments, based on information received and/or determined by the server feedback component 104 identifying a mental state of the user or providing an explicit request for a type of auxiliary information, information determined by content association component 108 identifying a specific part of the presentation associated with a cause of the mental state of the user, and/or information regarding a known trait (e.g., intellectual level, learning type, etc.) and/or preference of the user, the selection component 112 can employ the auxiliary information index 122 to identify, determine or select the appropriate auxiliary information (e.g., included auxiliary information database 124) for providing to the user. For example, based on reception of user feedback information indicating the user has a confused mental state in association with presentation of topic 2 of a presentation, the selection component 112 can access and employ the auxiliary information index 122 to determine whether clarifying auxiliary information has been provided for topic 2 in the auxiliary information database 124. In response to a determination that clarifying information has been provided for topic 2, the selection component 112 can retrieve the auxiliary information and the auxiliary information component 110 can provide (e.g., using server communication component 116) the auxiliary information to the user device (e.g., (e.g., a user device of the one or more user devices 128 or another device) associated with the user for rendering at the user device. Further, in an embodiment in which different versions of the auxiliary information associated with different user traits or preferences are provided, the selection component 112 can determine one or more traits and/or preferences of the user and select the version of the auxiliary information that is best suited for the user based on the user's traits and/or preferences. For example, if the user is a visual learner, the selection component 112 can select the version of the auxiliary information for topic 2 that is associated with visual learning. For instance, the visual learning version may include pictorial examples in lieu of another version of the auxiliary information for topic 2 that includes mathematical examples.

In one or more embodiments, the auxiliary information component 110 can provide (e.g., using server communication component 116) selected auxiliary information associated with a part of a presentation to a user device (e.g., a user device of the one or more user devices 128 or another device) of a user as or after the feedback is received and the part of the presentation is being presented. The user device can further render the auxiliary information in association with presentation of the part of the presentation (e.g., as the part is discussed in a live context, as the part is presented in a live-context, as the part is presented or played in a slideshow or video in a live or non-live environment, etc.). For example, if the auxiliary information is associated with a particular topic being presented, the user device can render the auxiliary information while the topic is being presented (or, in some embodiments, within a defined amount of time after the topic is presented). In other embodiments, the auxiliary information can be rendered at a later time, such as during a break period after the topic is discussed or after the entire presentation is finished.

The manner in which the auxiliary information is rendered at the user device (e.g., a user device of the one or more user devices 128) can vary depending on the features and functionalities of the user device, a type of content of the auxiliary information (e.g., text, images, video, audio, a hyperlink, etc.), a timing of rendering, and/or whether a visual component (e.g., a slideshow, a video, an animation, an image, etc.) associated with the presentation is also being rendered at the user device. For example, if the auxiliary information includes audio (e.g., a spoken description, a sound, a song, etc.) associated with a visual part of the presentation, the auxiliary information can be rendered via a speaker or earpiece of the user device as the user watches or experiences a visual part of the presentation. In another example, if the auxiliary information includes text, images, video, or a hyperlink, the auxiliary information can be displayed via a display screen of the user device. In one example embodiment, the user device can include a HUD device worn by a user as the user watches and/or experiences a presentation and the auxiliary information can be rendered in the HUD during presentation of the part of the presentation for which the auxiliary information is provided. For example, the user device can include a HUD device that is worn by a user while located within a classroom and viewing a slideshow presentation presented by a professor. The slideshow presentation can be displayed on a primary display screen at the front of the classroom. Accordingly, as the user is viewing the primary display screen at the front of the classroom, auxiliary information can be presented in the HUD and the user can continue to look at the primary display while also viewing the auxiliary information. Thus the auxiliary information will essentially appear as an overly onto the primary display at the front of the classroom. Further, in an embodiment in which the presentation includes slides or video that is also displayed via the display screen of the user device, the auxiliary information can be rendered in a pop-up display window or billboard as an overlay on the slide or video content or in an area of the display outside a display window including the slide or video content. In another example, the auxiliary information can be rendered in a different window or tab.

Figure 3:
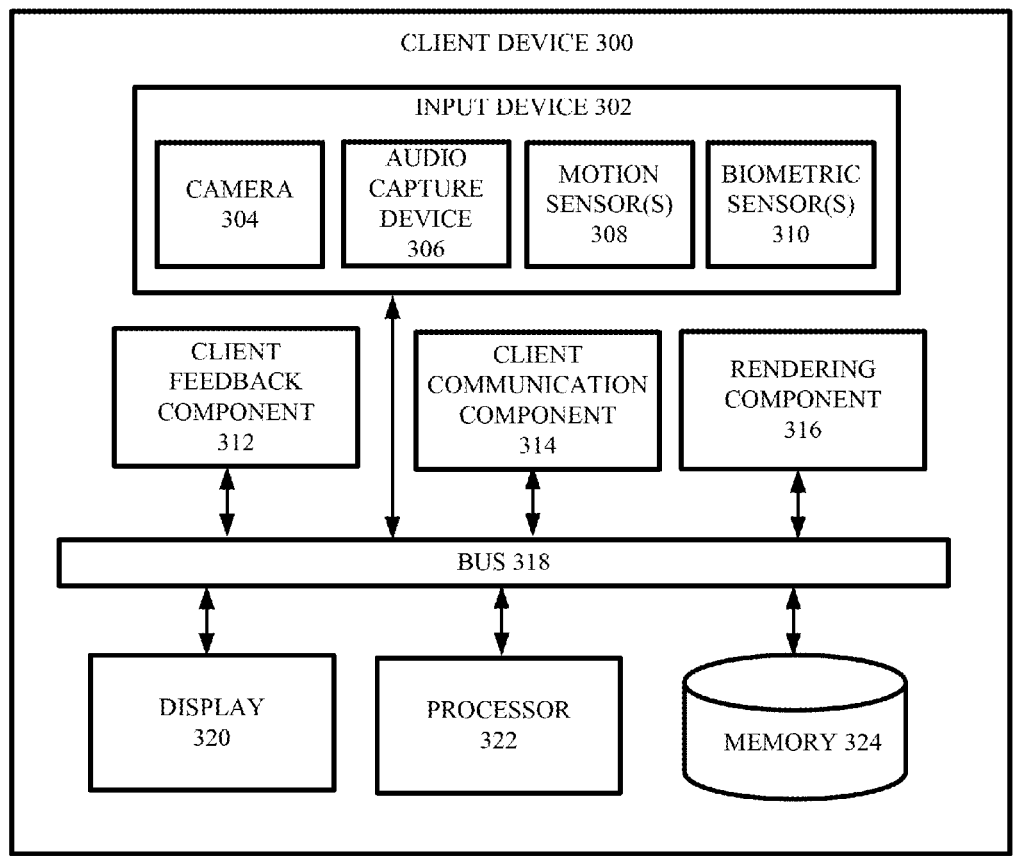
FIG. 3 illustrates a block diagram of an example, non-limiting user device that facilitates conditional provisioning of auxiliary information with a media presentation video in accordance with one or more embodiments described herein.

FIG. 3 illustrates a block diagram of an example, non-limiting user device 300 that facilitates conditional provisioning of auxiliary information with a media presentation video in accordance with one or more embodiments described herein. In various embodiments, user device 300 can be or include a user device of the one or more user devices 128 presented in system 100. Repetitive description of like embodiments employed in respective embodiments is omitted for sake of brevity.

User device 300 can include an input device 302, client feedback component 312, client communication component 314, rendering component 316 and a display 320. The user device 300 can also include or otherwise be associated with at least one memory 324 that stores computer-executable components (e.g., the client feedback component 312, the client communication component 314, and the rendering component 316). The user device 300 can also include or otherwise be associated with at least one processor 322 that executes the computer-executable components stored in the memory 120. The user device 300 can further include a device bus 318 that can couple the various components including, but not limited to, the input device 302, the client feedback component 312, the client communication component 314, the display 320, the memory 324 and/or processor 322.

In one or more embodiments, the client feedback component 312 can receive and/or process user feedback information regarding an interest or desire for auxiliary content associated with a presentation. For example, the client feedback component 312 can receive feedback information regarding a mental state of a user associated with user device 300 during a presentation. In some implementations, such user feedback can be captured by the user device 300 via an input device 302 provided at the user device. For example, the input device 302 can include but is not limited to, a camera 304, an audio capture device 306, one or more motion sensors 308 and/or one or more biometric sensors. In one implementation, the camera 304 can be a user facing camera that captures imagery (e.g., video and/or still images) of the user face during a presentation. In some embodiments, the camera 304 can also capture video and/or images of the user that can be processed to detect and identify motion of the user (e.g., blinking of eyes, nodding of head, etc.). The audio capture device 306 can include a microphone or another type of audio capture device that can receive and record audio during a presentation, such as speech spoken by the user associated with user device 300, speech of a presenter of the presentation, dialogue between the user and the presenter, and/or dialogue between the user and another user. In some implementations, the audio capture device 306 can further process captured audio to convert detected speech to text. The one or more motion sensors 308 can include, for example, an accelerometer and/or a gyroscope that can detect motion of the user device 300 when worn, held or otherwise operated by the user. The one or more biometric sensors 310 can include biometric sensors that detect biometric information for the user during a presentation, including, but not limited to, heart rate, respiratory rate, and hormone levels of the user. In some implementations, one or more of the motion sensors 308 and/or the biometric sensors can be external to the user device 300 (e.g., worn by the user, implanted within the user, etc.) and communicatively coupled to the user device 300.

In some embodiments, feedback information captured via the input device 302 can be received and processed by the client feedback component 312 to determine a mental state of the user based on the feedback. For example, the client feedback component 312 can determine a mental state of the user based on analysis of one or more facial expressions included in imaged data captured via the camera, based on analysis of tone of voice and words spoken in speech of the user captured via audio capture device 306, based on analysis of motion data regarding body language of the user captured via the one or more motion sensors 308, and/or based on analysis of biometric data for the user captured via the one or more biometric sensors 310. According to these embodiments, the client communication component 314 can send the processed feedback data identifying a mental state of the user to the presentation server device 102 to facilitate receiving auxiliary information from the presentation server device 102. In some embodiments, the sending can be performed in real-time or substantially real-time. In some embodiments, the client communication component 314 can send the presentation server device 102 raw feedback information captured via the input device 302 for processing by the server feedback component 104. The client communication component 314 can include same or similar features and functionalities as server communication component 116. For example, in one or more embodiments, the client communication component 314 can include hardware and/or software that facilitate wired or wireless communication between the user device 300 and the presentation server device 102, and between the user device 300 and one or more other external devices (not shown).

In some embodiments, the client feedback component 312 can also receive explicit input (e.g., via the input device 302) indicating a mental state of the user and/or a desire for a type of auxiliary information associated with a presentation. For example, using an input mechanism provided by the input device 302, the user can generate a defined signal that indicates the user is confused, interested, bored, etc. at any given time during a presentation. Similarly the user can provide input that includes an explicit request for a type of auxiliary information (e.g., "please provide me with clarifying information on this topic"). It should be appreciated that the input mechanism can vary. For example, the user can provide speech input, motion gesture input (e.g., blinking of eye, nodding of head, tapping of foot, raising of hand, etc.), as well as input via a hard or soft button, a keypad, a touch screen, a mouse, etc. The client feedback component 312 can also receive such explicit input and the client communication component 314 can provide this explicit input to the presentation server device 102.

The client communication component 314 can further receive auxiliary information from the presentation server device 102 based on the feedback information provided to the presentation server device 102. In some implementations, the client communication component 314 can also receive the presentation or a part of the presentation. For example, the client communication component 314 can download the presentation or a part of the presentation for rendering at the user device 300 and/or receive the presentation or a part of the presentation as streamed media for rendering at the user device 300.

The rendering component 316 can render auxiliary information received from the presentation server device 102. For example, in an embodiment in which the auxiliary information includes audio, the rendering component 316 can cause the audio to be played at the user device 300 via a speaker of the user device (e.g., not shown). In another example, in an embodiment in which the auxiliary information includes visual data (e.g., text, images, video, hyperlinks, etc.) the rendering component 316 can generate a graphical user interface that can be displayed via the display 320 of the user device 300 and including received auxiliary information. The appearance of the auxiliary information can vary depending on the features and functionalities of the user device 300 and the type of content of the auxiliary information. In one embodiment, the display 320 includes a HUD device and the auxiliary information can be rendered in the HUD device. In some embodiments, the rendering component 316 can also render the presentation at the user device 300 (e.g., via display 320 and/or via a speaker of the user device). In embodiment in which the presentation includes visual content (e.g., a slideshow, a video, etc.) that is rendered via the display 320, in some implementations, the rendering component 316 can render the auxiliary information as an overly on the visual content (e.g., via a pop-up display window or a billboard).

Figure 4:
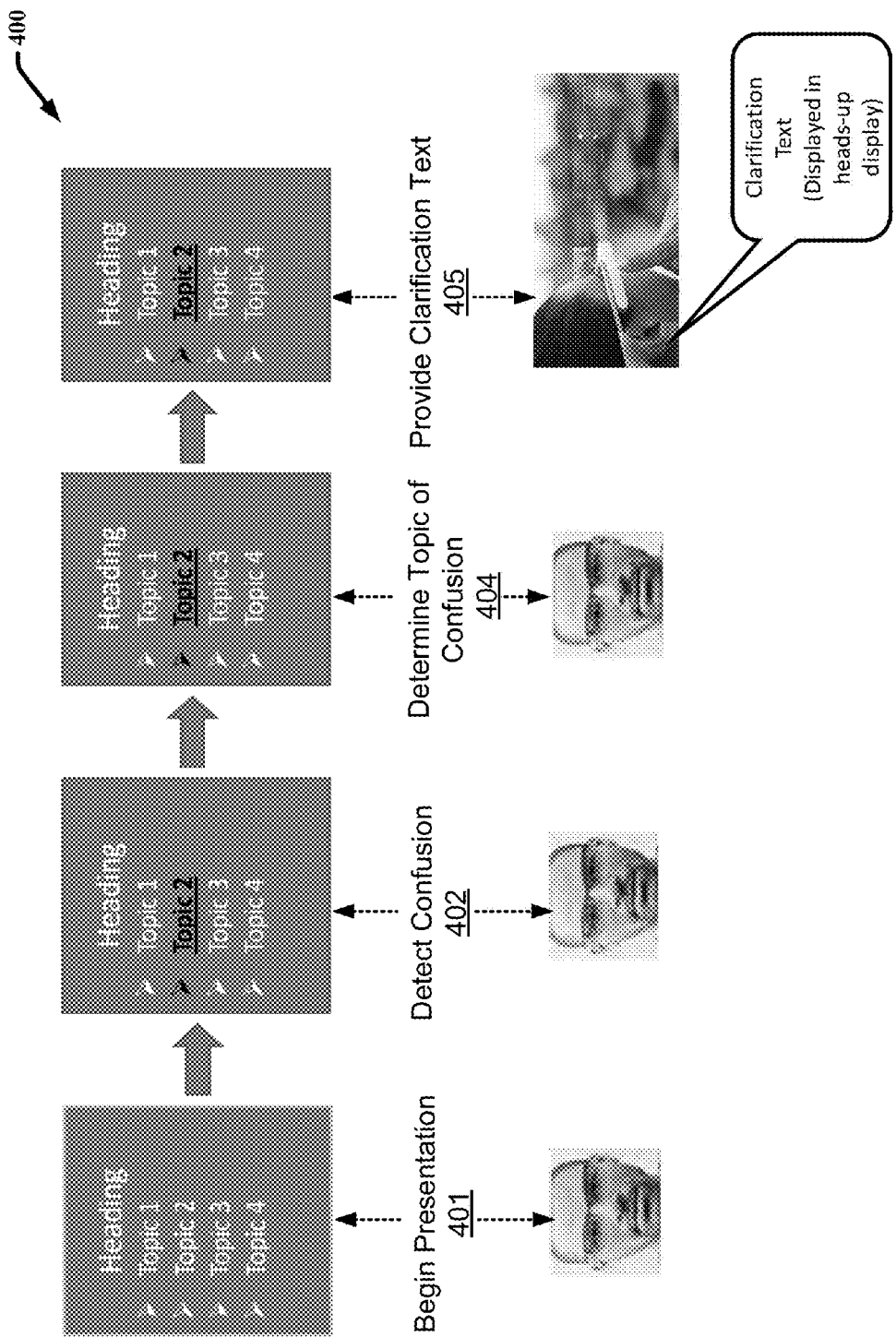
FIG. 4 illustrates a flow diagram of an example, non-limiting process that facilitates conditional provisioning of auxiliary information with a a media presentation to a user based on a mental state of the user in accordance with one or more embodiments described herein.

FIG. 4 illustrates a flow diagram of an example, non-limiting process 400 that facilitates conditional provisioning of auxiliary information with a a media presentation to a user based on a mental state of the user in accordance with one or more embodiments described herein. Repetitive description of like embodiments employed in respective embodiments is omitted for sake of brevity.

In the embodiment shown, a user is wearing glasses that function as a HUD device while experiencing a media presentation. For example, the user may be in classroom setting attending a live lecture presented by a professor and that may include a slideshow presentation. In another example, the user may be walking about a museum while listening to an audio recording presentation regarding artwork in the museum. In another example, the user may be at home and experiencing the media presentation via HUD device. The presentation, for example, may include an educational video or a recorded lecture.

At 401, the presentation begins. In the implementation shown, the presentation includes four topics for which information identifying the topics and auxiliary information for at least topic 2 have been established prior to beginning the presentation (e.g., and provided to the presentation server device 102). In the implementation shown, each of the 4 topics is associated with a different slides or a single slide included in a slideshow element of the media presentation. In another example, each (or, in some embodiments, one or more) of the 4 topics may be identified in an outline of the presentation provided to the presentation server device 102 in association with auxiliary information for the respective topics. At 402, as the presentation is being presented, it is detected that the user has a confused mental state based on one or more of the types of feedback discussed herein (e.g., via client feedback component 312 and/or server feedback component 104. For instance in one example, the HUD device can capture visual imagery of the user face and the client feedback component 312 or the server feedback component 104 can determine a mental state of confusion of the user based on one or more facial expression of the user included in the imagery. At 404, the topic associated with the user's mental state of confusion is determined using one or more of the mechanisms described herein (e.g., via the content association component 108). Then at 405, clarification text is provided to the user at the user's HUD device (e.g., via auxiliary information component 110 and server communication component 116) and rendered via the HUD device.

Figure 5:
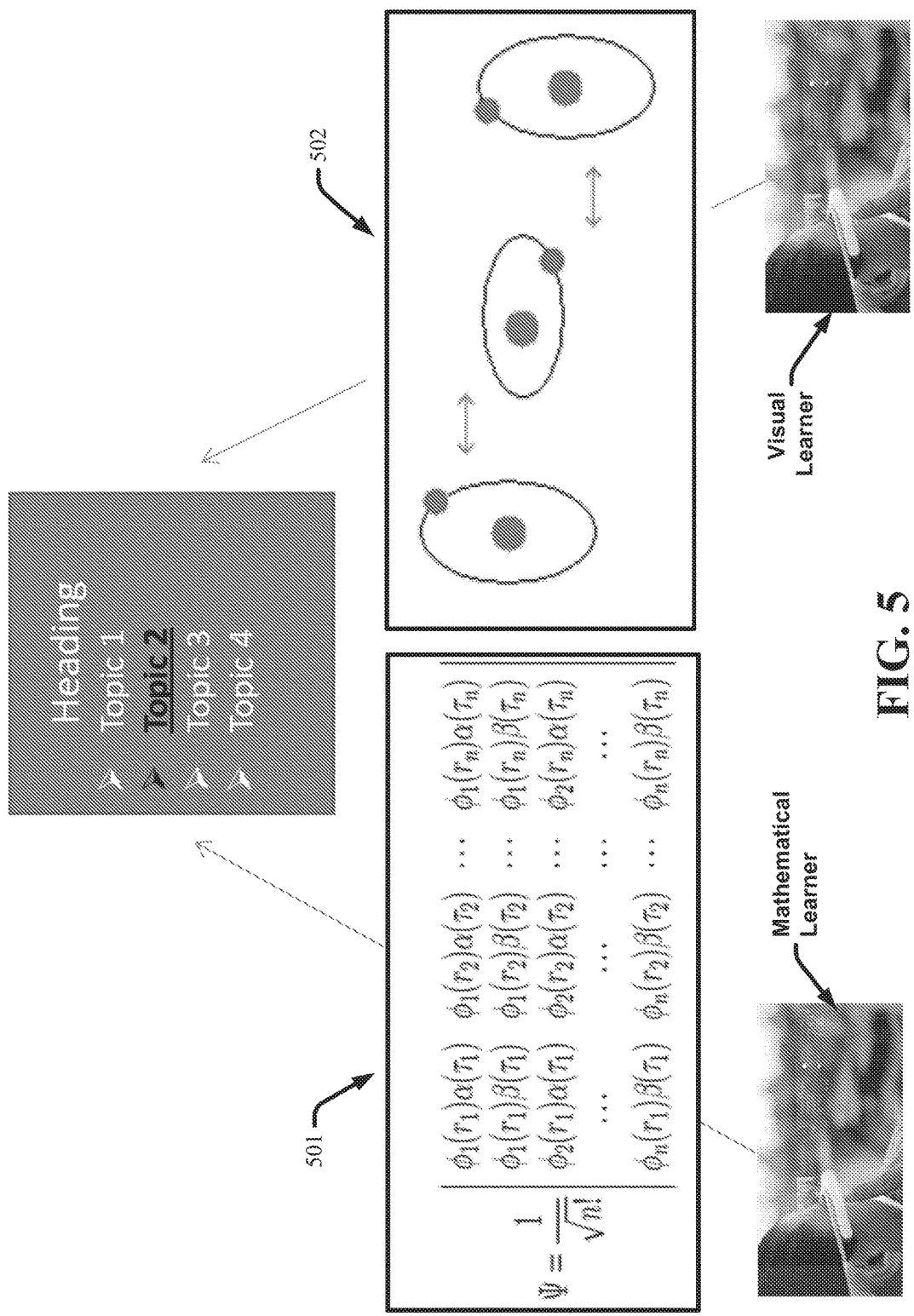
FIG. 5 illustrates a block diagram showing presentation of different auxiliary information associated to different users based on different intellectual abilities of the users in accordance with one or more embodiments described herein.

FIG. 5 illustrates a block diagram showing presentation of different auxiliary information associated to different users for a same topic (e.g., topic 2) and based on different intellectual abilities of the users in accordance with one or more embodiments described herein. Repetitive description of like embodiments employed in respective embodiments is omitted for sake of brevity.

For example, in the embodiment shown, two different users, a mathematical learner and a visual learner, provided feedback information in association with viewing, listening to, or otherwise experiencing a presentation indicating they both were confused about topic 2 of the presentation. Based on the feedback information, auxiliary information 501 including a mathematical explanation of topic 2 can be presented to the mathematical learner. On the other hand, auxiliary information 502 including s a visual clarifying explanation of topic 2 can be presented to the visual learner.

Figure 6:
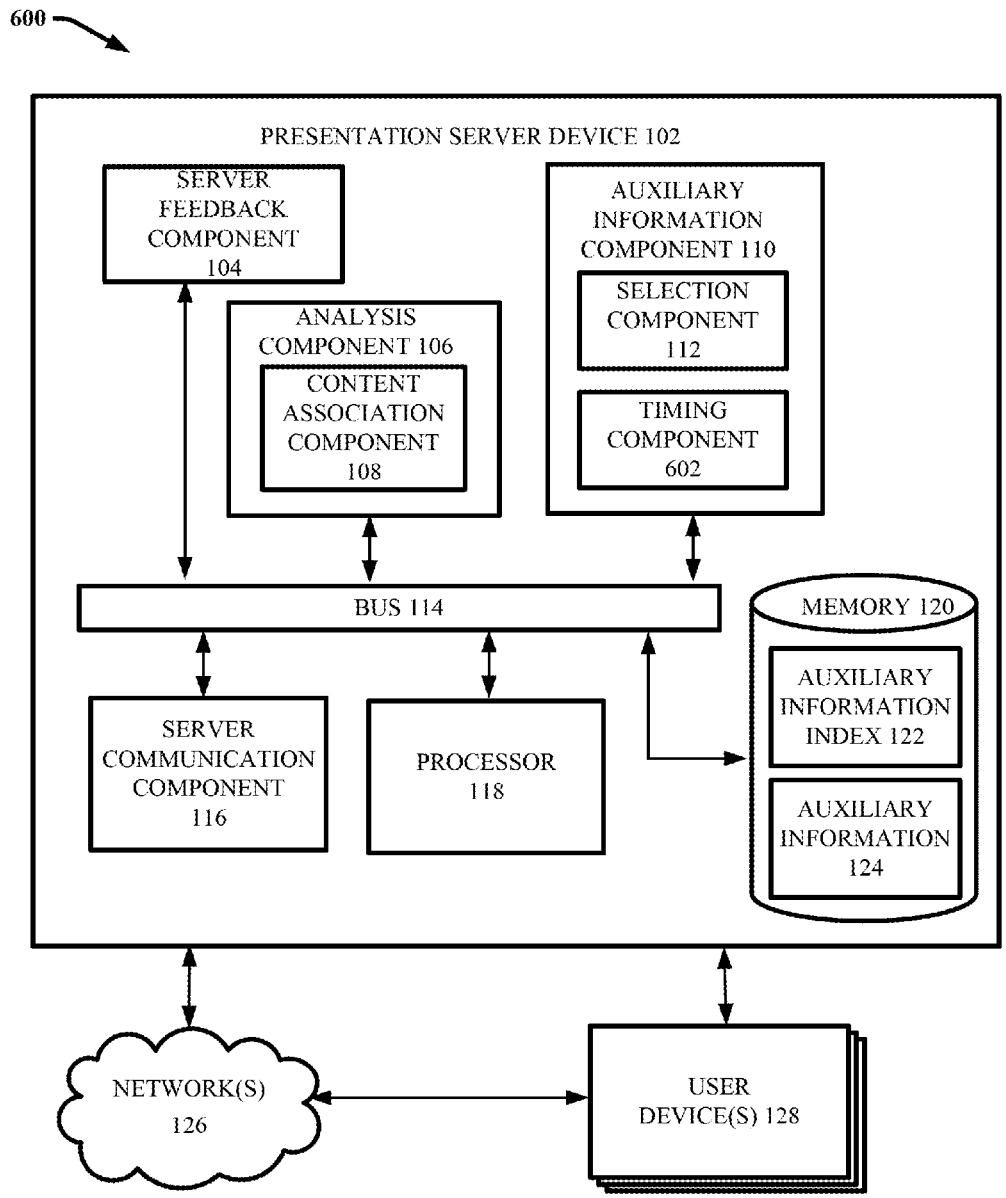
FIG. 6 illustrates a block diagram of another example, non-limiting system that facilitates conditional provisioning of auxiliary information with a media presentation in accordance with one or more embodiments described herein.

FIG. 6 illustrates a block diagram of another example, non-limiting system 600 that facilitates conditional provisioning of auxiliary information with a media presentation in accordance with one or more embodiments described herein. System 600 includes same or similar features as system 100 with the addition of timing component 602. Repetitive description of like elements employed in respective embodiment is omitted for sake of brevity.

In various embodiments, the auxiliary information component 110 can provide auxiliary information to a user device (e.g., a user device of the one or more user devices 128) for rendering in association with presentation of the particular part of presentation that the auxiliary information is associated with. For example, if the auxiliary information is associated with topic 2 of a presentation, the auxiliary information component 110 can provide (e.g., using server communication component 116) the auxiliary information to the user device for rending in real-time in association with presentation of topic 2. For example, if the auxiliary information includes visual information (text, images, video, a hyperlink, etc.) it can be displayed via a display screen of the user device. In some implementations in which a visual component of the presentation is also displayed at the user device (e.g., a slideshow, a video, etc.) the auxiliary information can be rendered in an overlay window or billboard onto the visual component of the presentation.

In association with rendering auxiliary information during a presentation and particularly in association with a specific part of the presentation, the timing component 602 can determine timing for presentation of the auxiliary information (e.g., a start time and duration for presentation of the auxiliary information). In one or more embodiments, the timing for presentation of auxiliary information can be based on the amount of content included in the auxiliary information, wherein larger amounts of content are presented for longer periods of time. In another implementation, the timing for presentation of auxiliary information can be cued such that the auxiliary information for a particular topic is rendered as soon as it is received at the user device (e.g., in response to receiving user feedback by the server feedback component 104) and removed or dismissed from being displayed upon the beginning of a new topic, sub-topic, subject, slide, etc. In another implementation, the timing for presentation of auxiliary information can be based on a character trait of preference of the user. For example, the timing component 602 can determine duration for presentation of auxiliary information based on a reading level of the user, an intellectual capability or level of the user, or multi-tasking ability of the user. For instance in some embodiments, users associated with a relatively low reading level or intellectual capability (e.g., with respect to threshold level) can be provided with auxiliary information that is displayed for a longer duration relative users with a relatively high reading level or intellectual capability, such that the users with the lower reading level or intellectual capability are provided more time to review the auxiliary information. Still in other embodiments, the duration of display of auxiliary information can be controlled by the user viewing the auxiliary information. For example, the user can select and control when to minimize or dismiss display of the auxiliary information.

In various additional embodiments, auxiliary information that is provided to a user device in association with a presentation can be collected and retained (e.g., in memory 324 at the user device and/or accessed at the presentation server device 102) for later review by the user after the presentation is complete or during break periods between the beginning and end of the presentation. In some additional embodiments, the timing component 602 can determine that certain auxiliary information is not suitable for display during the presentation but during a planned break period. For example, depending on the length and complexity of the auxiliary information, a type of content of the auxiliary information (e.g., a video, or hyperlink to a scientific article, etc.), a trait or preference of the user, and a multi-tasking ability of the user, the timing component 602 can determine whether to display the auxiliary information during the presentation or during a planned break period. For example, the timing component 602 can determine that auxiliary information requiring significant time for review or attention of the user should be saved for presentation during a break period in which the user has more time to review the auxiliary information with the full attention of the user. In some implementation, auxiliary information rendered during a break period can be displayed in a larger window (e.g., using the full dimensions of the user device display) relative to a window that includes auxiliary information when rendered during the presentation.

In one implementation, in response to a determination that the auxiliary information should be displayed during a planned break period, the auxiliary information component 110 can notify the user during the presentation that auxiliary information for a particular topic, sub-topic element, etc., has been selected for the review by the user during the upcoming break period. For example, the user can receive an audible signal or visual signal that is rendered at the user device in association with the particular topic, sub-topic, element etc. Accordingly, the user will know ahead of time that he or she will get clarifying information or supplementary information about the particular topic, sub-topic, etc. soon and to relax and enjoy the presentation. When the break period arrives, the auxiliary information component 110 can then send the auxiliary information to the user device for presentation, or the user device can receive the auxiliary information at an earlier time and wait to display the auxiliary information until the break period based on timing metadata associated with the auxiliary information by the timing component 602 identifying the time when the auxiliary information should be displayed.

Figure 7:
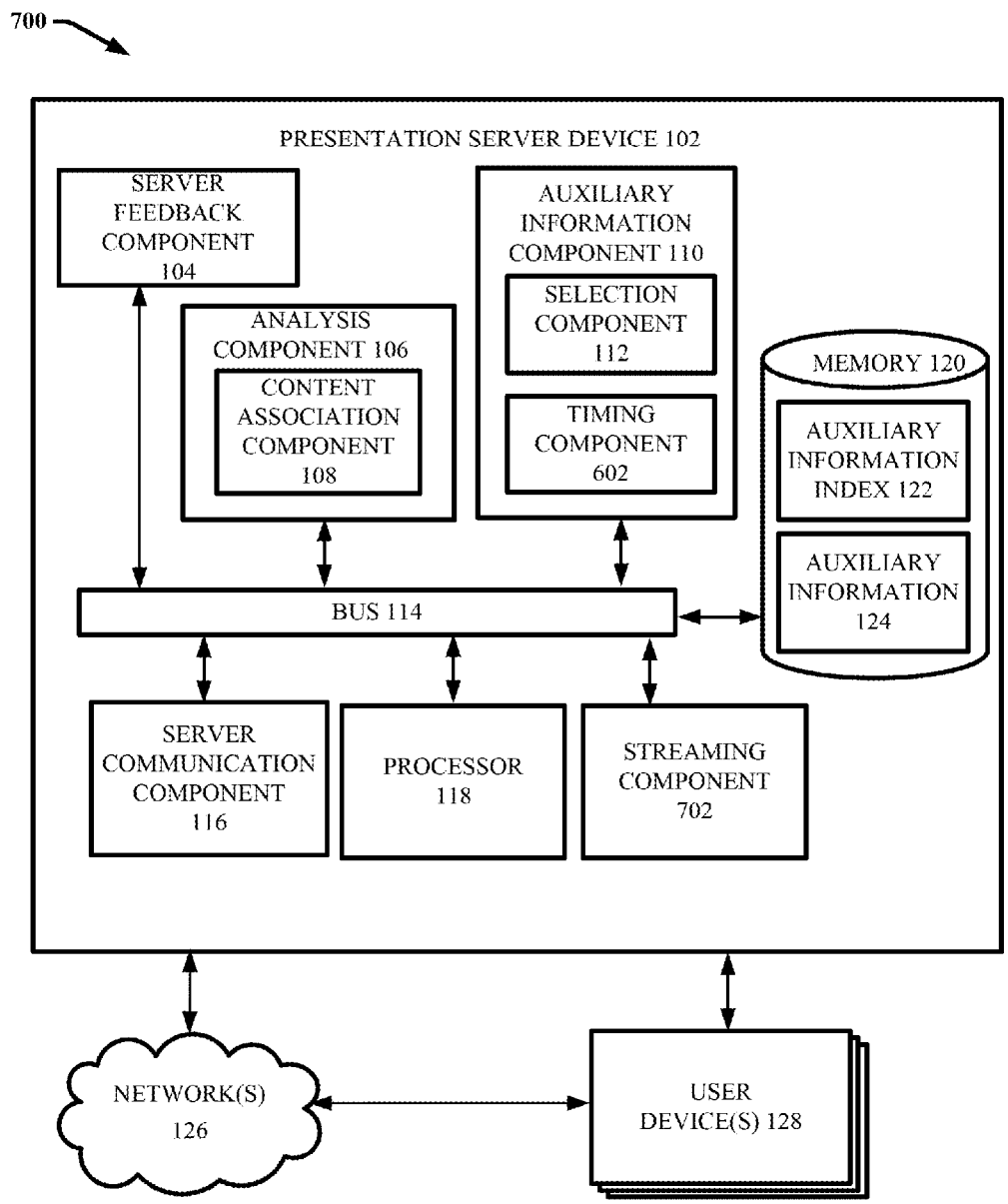
FIG. 7 illustrates a block diagram of another example, non-limiting system that facilitates conditional provisioning of auxiliary information with a media presentation in accordance with one or more embodiments described herein.

FIG. 7 illustrates a block diagram of another example, non-limiting system 700 that facilitates conditional provisioning of auxiliary information with a media presentation in accordance with one or more embodiments described herein. System 700 includes same or similar features as system 600 with the addition of streaming component 702. Repetitive description of like elements employed in respective embodiment is omitted for sake of brevity.

In some embodiments, the presentation server device 102 can employ streaming component 702 to stream auxiliary information to the one or more user devices 128 based on received feedback for users associated with the respective user devices indicating a need or desire for the auxiliary information. For example, rather than providing the auxiliary information to user devices as a download, the auxiliary information can be retained at the presentation server device 102 and streamed to a user device in association with a presentation via the streaming component 702. In some implementations, the auxiliary information can include a video, an animation, or audio that can be streamed by the presentation server device 102 to a user device when called for. In addition, in one or more implementations, the presentation server device 102 can also stream a presentation to the one or more user devices. For instance, the streaming component can stream a visual and/or audio component of a media presentation to the one or more user devices for concurrent presentation of the visual and/or audio component of the media presentation at the respective devices. For example, in an implementation in which the presentation includes a video, the streaming component 702 can stream the video to the one or more user device for concurrent playback at the respective user devices. In another example, in which the presentation includes a slideshow that is presented in association with a live or recorded description of the slides by a presenter, the streaming component 702 can stream the slideshow to the one or more user device for concurrent playback at the respective user devices in association with reception of speech associated provided by the presenter. Still in other embodiments, the streaming component 702 can stream live presentations filmed at remote locations relative to the one or more user devices for concurrent playback at the one or more user devices 128.

Figure 8:
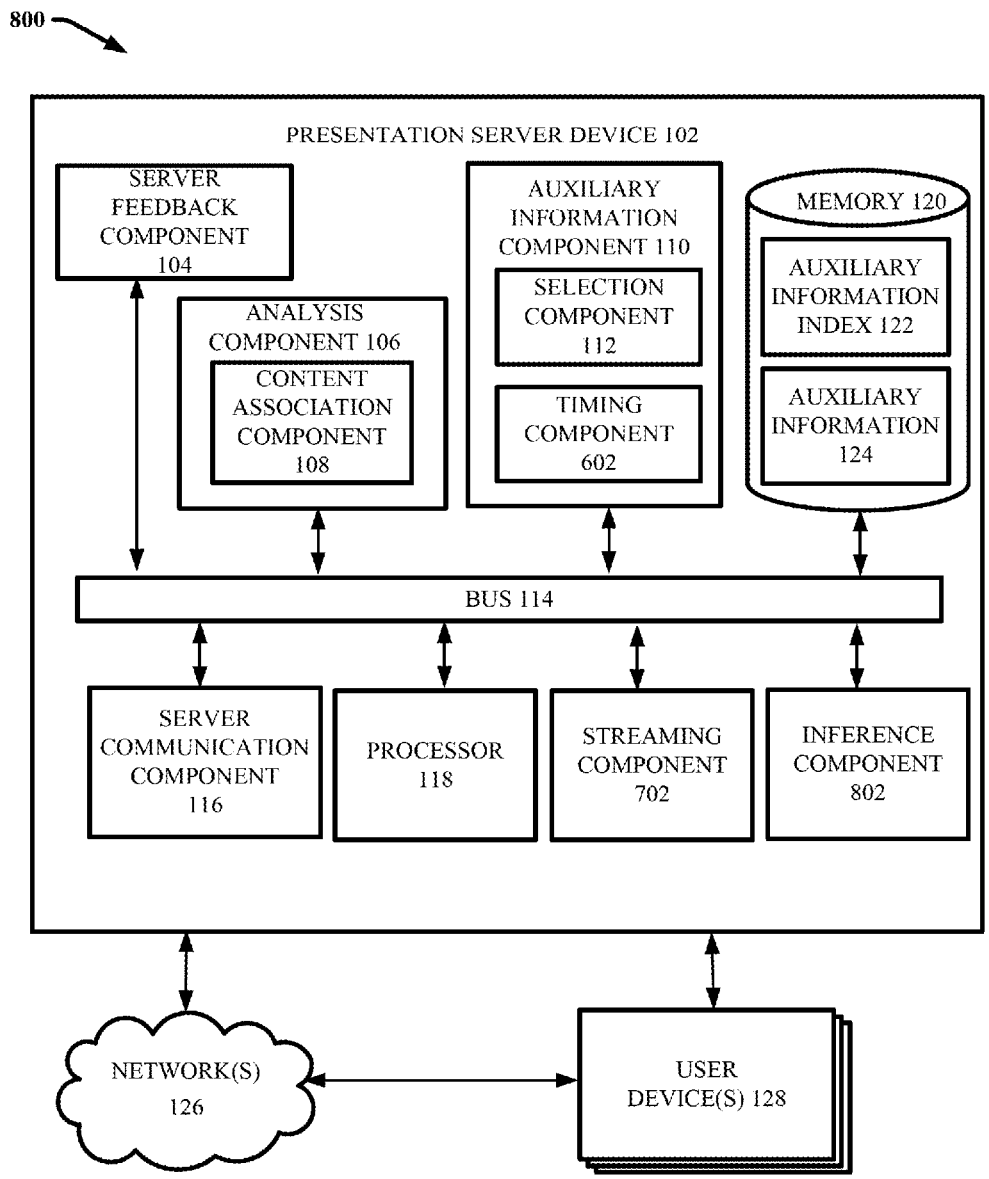
FIG. 8 illustrates a block diagram of another example, non-limiting system that facilitates conditional provisioning of auxiliary information with a media presentation in accordance with one or more embodiments described herein.

FIG. 8 illustrates a block diagram of another example, non-limiting system 800 that facilitates conditional provisioning of auxiliary information with a media presentation in accordance with one or more embodiments described herein. System 800 includes same or similar features as system 700 with the addition of inference component 802. Repetitive description of like elements employed in respective embodiment is omitted for sake of brevity.

Inference component 802 can aid in various inferences or determinations associated with aspects of presentation server device 102. For example, inference component 802 can facilitate the server feedback component 104 and/or the client feedback component 312 in association with inferring a mental state of a user based on feedback regarding facial expression of the user, speech of the user, motion or body movement of the user, and biometric data of the user captured during a presentation. The inference component 802 can further aid in determining what part of a presentation a user's feedback is directed to. The inference component 802 can further facilitate the auxiliary information component 110 in association with inferring or determining what auxiliary information to provide to a particular user and when (e.g., timing information) to provide the auxiliary information.

In order to provide for or aid in the numerous inferences described herein, inference component 802 can examine the entirety or a subset of the data to which it is granted access and can provide for reasoning about or infer states of the system (e.g., system 800 and the like), environment, etc. from a set of observations as captured via events and/or data. An inference can be employed to identify a specific context or action, or can generate a probability distribution over states, for example. The inference can be probabilistic (e.g., the computation of a probability distribution over states of interest can be based on a consideration of data and events). An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x4, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 9:
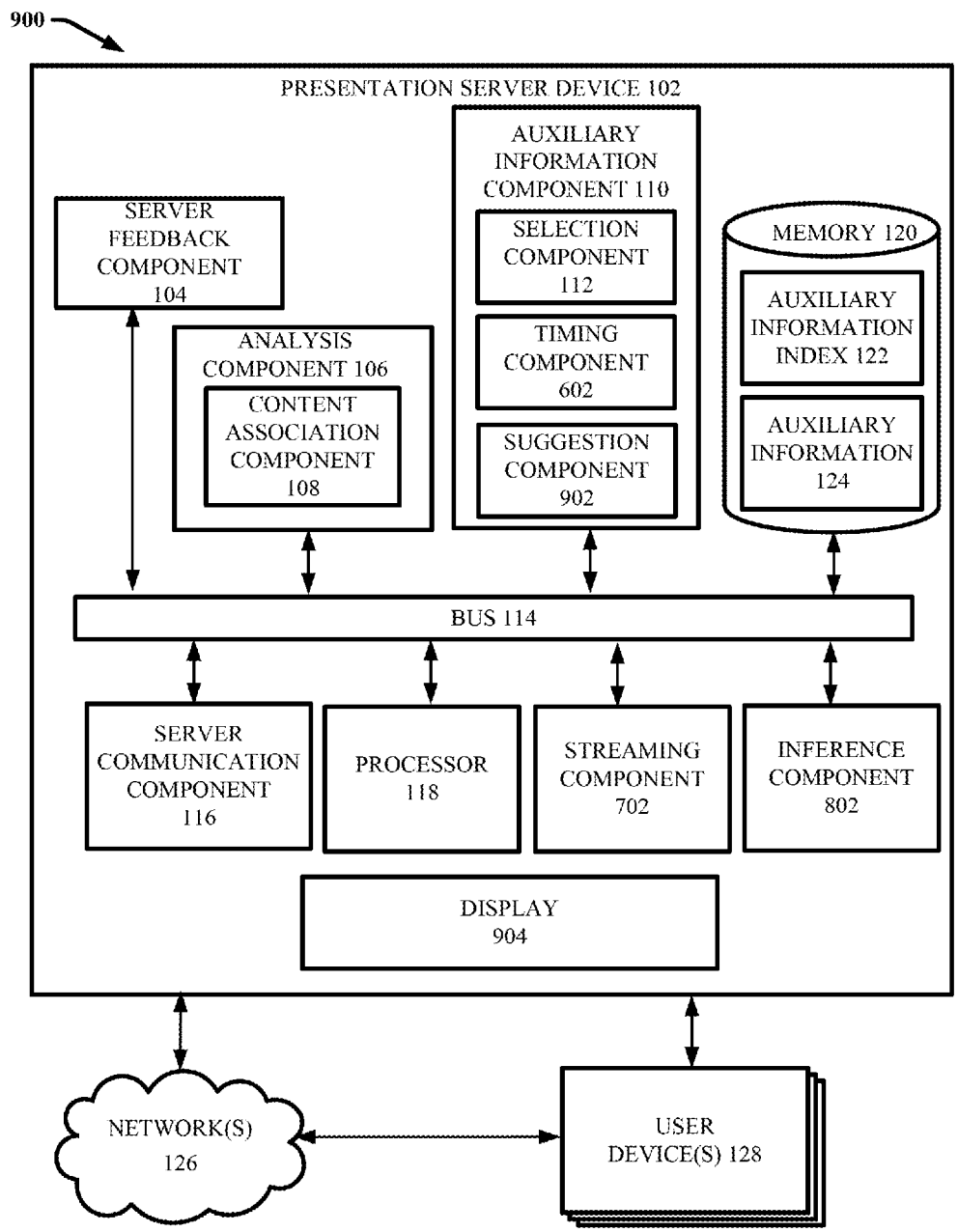
FIG. 9 illustrates a block diagram of another example, non-limiting system that facilitates conditional provisioning of auxiliary information with a media presentation in accordance with one or more embodiments described herein.

FIG. 9 illustrates a block diagram of another example, non-limiting system 900 that facilitates conditional provisioning of auxiliary information with a media presentation in accordance with one or more embodiments described herein. System 900 includes same or similar features as system 800 with the addition of suggestion component 902 to the auxiliary information component 110 and a display 904. Repetitive description of like elements employed in respective embodiment is omitted for sake of brevity.

In some embodiments, a presenter of a presentation or an assistant of the presenter (or another suitable entity) can play an active role in providing auxiliary information to users at their respective user devices 128 during a presentation. For example, in many of the previously described embodiments, the auxiliary information component 110 can automatically select (e.g., via selection component 112) auxiliary information and provide the auxiliary information to a user based on reception, via server feedback component 104, of feedback information from the user indicating a need or desire for the auxiliary information in association with a particular part of a presentation. In various alternative embodiments, rather than automatically providing the auxiliary information to a user device of the user, the suggestion component 902 can provide the presenter information identifying the user and indicating the mental state of the user or identifying an explicit request received from the user for a type of auxiliary information. In some implementations, the suggestion component 902 can further provide information identifying the auxiliary information that is associated with the part of the presentation associated with the received feedback, and the traits/preferences of the user (e.g., the auxiliary information selected by the selection component 112 based on the above noted factors). The suggestion component 902 can further suggest the presenter provide the user with the identified auxiliary information.

For example, in one or more implementations, the presentation server device 102 can be accessed and operated by the presenter either directly or indirectly (e.g., using another device to interface with the presentation server device 102). In an implementation in which the presenter can access the presentation server device directly, the presentation server device 102 can include a display 904 via which information provided by the suggestion component 902 can be displayed to the presenter. In an embodiment in which the presenter interfaces with the presentation server device 102 via another device (e.g., a user computer, a tablet, a classroom computer, etc.), the information provided by the suggestion component 902 can be rendered via a display at the other device. For example, in an embodiment in which the presenter is presenting a presentation to a group of users, the suggestion component 902 can provide the presenter with a display that is regularly updated throughout the presentation indicating the mental states of the respective users.

Figure 10:
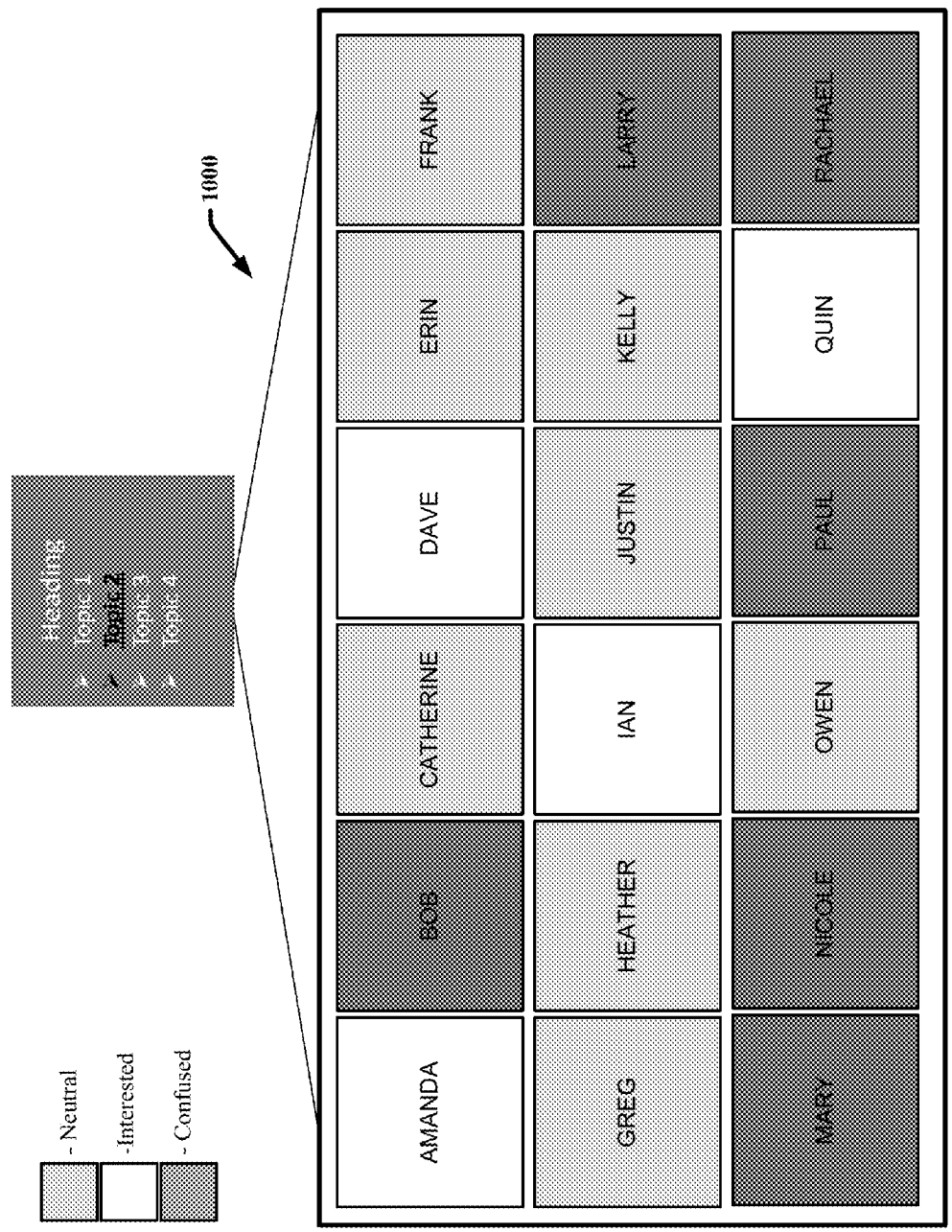
FIG. 10 illustrates a diagram of an example, non-limiting heat map corresponding to different mental states of different users responsive to a presentation in accordance with one or more embodiments described herein.

FIG. 10 illustrates a diagram of an example, non-limiting heat map 1000 corresponding to different mental states of different users responsive to a presentation in accordance with one or more embodiments described herein. Repetitive description of like elements employed in other embodiments described herein is omitted for sake of brevity.

In particular, the heat map 1000 depicts the mental states of the different users (e.g., Amanda, Bob, Catherine . . . Rachael) in response to topic 2 of a presentation. Those users associated with a light grey coloration are considered to have a neutral mental state, those associated with a white coloration are considered to have an interested mental state, and those associated with a dark gray coloration are considered to have a confused mental state. In an exemplary embodiment, the heat map 1000 can be generated by the presentation server device 102 based on information received from the server feedback component 104 regarding mental states of the different users during the presentation. The heat map 1000 can further be rendered to a presenter of the presentation (or another suitable entity) via a display (e.g., display 904 or a display associated with another device that can interface with the presentation server device 102).

With reference back to FIG. 9, based on reception of information from the suggestion component 902 regarding a mental state of a user, a topic of the presentation associated with the mental state, and/or auxiliary information suitable and available for providing to the user, the presenter can choose whether and when to provide the auxiliary information to the user. For example, the presenter can provide input that can be received by the auxiliary information component 110 requesting the auxiliary information be sent to the user or provide input requesting the auxiliary information not be sent to the user. Based on input indicating the presenter wants the auxiliary information sent to the user, the auxiliary information component 110 can then proceed to provide the auxiliary information to the user as requested. In some embodiments, the presenter can also choose what auxiliary information to provide to the user or create auxiliary information to provide to the user. Further, in situations in which a majority of a group of user (e.g., most of the students in the class), have a similar mental reaction to a particular part of the presentation, the presenter can choose to change the content of the presentation or render the auxiliary information to every user in the group. The presenter can further discuss the auxiliary information in more detail in a live setting rather than providing the auxiliary information to the users for the users to parse through on their own.

Figure 11:
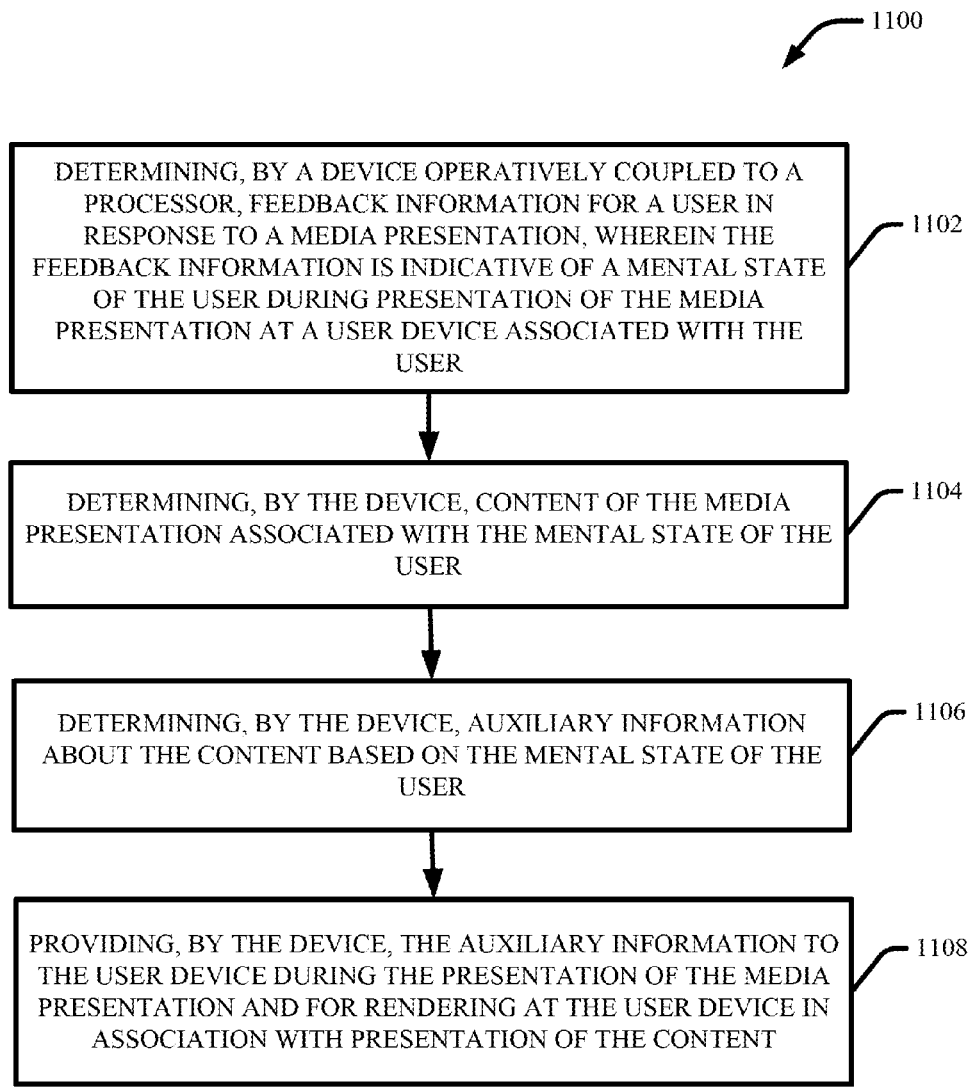
FIG. 11 illustrates a flow diagram of an example, non-limiting computer-implemented method that facilitates conditional provisioning of auxiliary information with a media presentation in accordance with one or more embodiments described herein.

FIG. 11 illustrates a flow diagram of an example, non-limiting computer-implemented method 1100 that facilitates conditional provisioning of auxiliary information with a media presentation in accordance with one or more embodiments described herein. Repetitive description of like elements employed in other embodiments described herein is omitted for sake of brevity.

At 1102, a device operatively coupled to a processor (e.g., presentation server device 102) can determine feedback information for a user in response to a media presentation, wherein the feedback information is indicative of a mental state of the user during presentation of the media presentation at a user device associated with the user. At 1104, the device can determine content of the media presentation associated with the mental state of the user (e.g., via content association component 108). At 1106, the device can determine auxiliary information about the content based on the mental state of the user (e.g., via auxiliary information component 110). At 1108, the device can provide the auxiliary information to the user device during the presentation of the media presentation and for rendering at the user device in association with presentation of the content (e.g., via server communication component 116 of FIG. 1 and/or streaming component 702 of FIG. 7).

Figure 12:
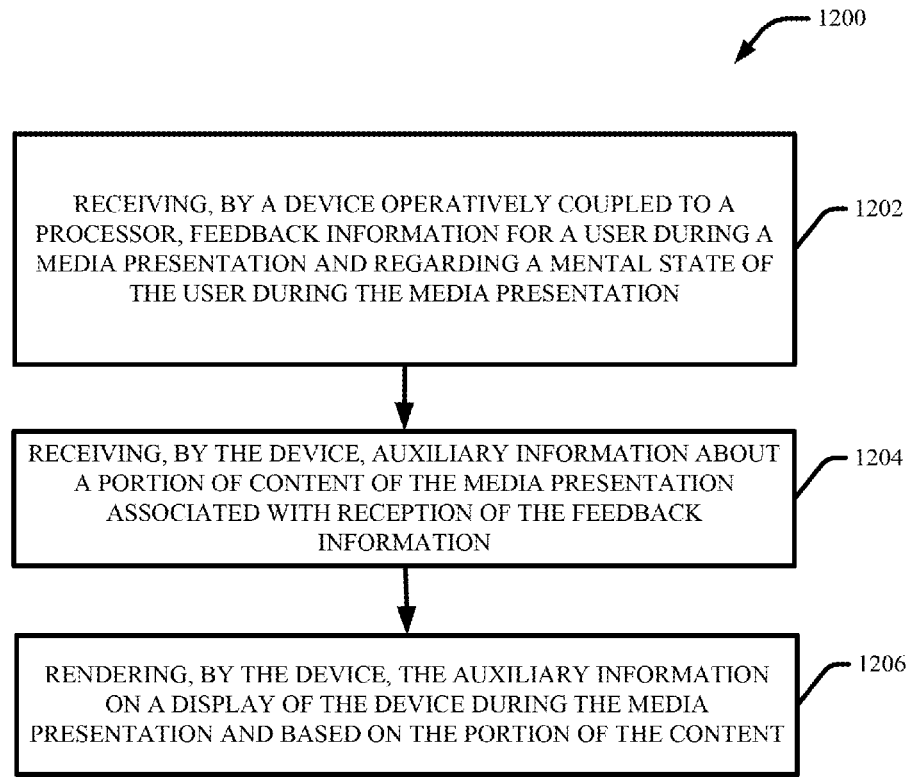
FIG. 12 illustrates a flow diagram of another example, non-limiting computer-implemented method that facilitates conditional provisioning of auxiliary information with a media presentation in accordance with one or more embodiments described herein.

FIG. 12 illustrates a flow diagram of another example, non-limiting computer-implemented method 1200 that facilitates conditional provisioning of auxiliary information with a media presentation in accordance with one or more embodiments described herein. Repetitive description of like elements employed in other embodiments described herein is omitted for sake of brevity.

At 1202, a device operatively coupled to a processor (e.g., user device 300) can receive feedback information for a user during a media presentation and regarding a mental state of the user during the media presentation (e.g., via client feedback component 312 of user device 300). At 1204, the device can receive auxiliary information about a portion of content of the media presentation associated with reception of the feedback information (e.g., via client communication component 314 of user device 300). At 1206, the device can render the auxiliary information on a display of the device during the media presentation and based on the portion of the content (e.g., via rendering component 316 of user device 300).

Figure 13:
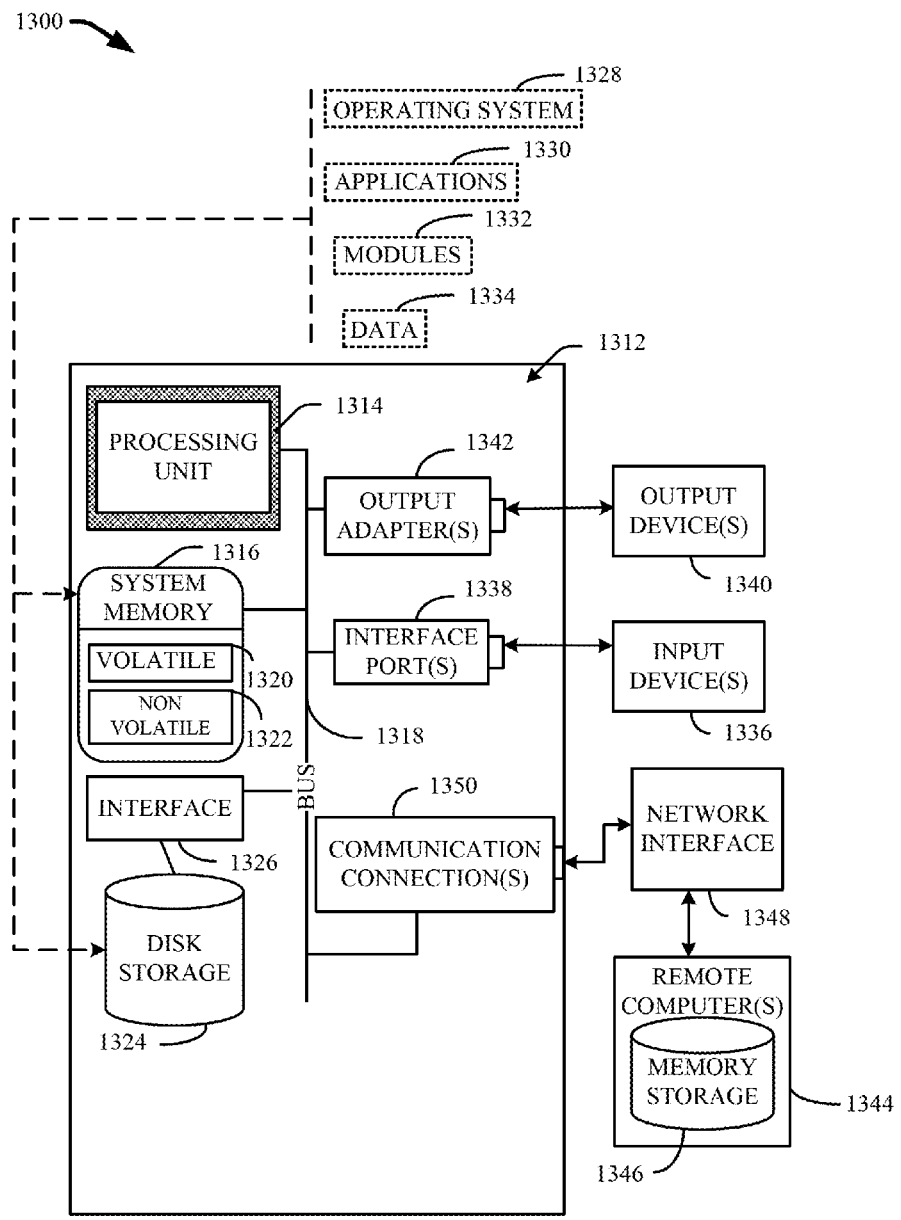
FIG. 13 illustrates a block diagram of an example non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1301 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1301. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer-executable components;
 a processor that executes the computer-executable components stored in the memory, wherein the computer-executable components comprise:
  a feedback component that receives feedback information indicative of a mental state of a user during presentation of a media presentation;
  an analysis component that determines content of the media presentation associated with the mental state of the user; and
  an auxiliary information component that determines, based on the mental state of the user, auxiliary information associated with the content to render at a user device in association with the presentation of the media presentation to the user, wherein the auxiliary information component determines the auxiliary information to comprise clarifying information about the content based on a determination that the mental state of the user comprises a state of confusion.

2. The system of claim 1, wherein the computer-executable components further comprise:
 a communication component that sends the auxiliary information to the user device during the presentation of the media presentation to render at the user device in association with presentation of the content.

3. The system of claim 1, wherein based on a second determination that the mental state of the user comprises a state of intrigue, the auxiliary information component determines the auxiliary information to comprise supplementary information about the content.

4. The system of claim 1, wherein the feedback information comprises information identifying one or more facial expressions of the user, and wherein the feedback component determines the mental state of the user based on analysis of the information identifying the one or more facial expressions of the user.

5. The system of claim 1, wherein the feedback component further receives speech information at a time associated with reception of the feedback information, wherein the speech information is associated with speech spoken by a presenter of the media presentation during the presentation of the media presentation, and wherein the analysis component determines the content based on a determination that the speech information is related to the content.

6. The system of claim 1, wherein the auxiliary information component further determines the auxiliary information based on user profile information associated with the user.

7. The system of claim 6, wherein the user profile information identifies an intellectual level of the user.

8. The system of claim 1, wherein the auxiliary information comprises a textual description, and wherein the auxiliary information component further determines a length of the textual description based on user profile information associated with the user, and wherein the user profile information identifies an intellectual capability of the user.

9. The system of claim 1, wherein the computer-executable components further comprise:
a streaming component that streams a visual component of the media presentation to the user device and one or more additional user devices for concurrent presentation of the visual component of the media presentation at the user device and the one or more additional user devices in association with reception of speech information provided by a presenter of the media presentation.

10. A device comprising:
a memory that stores computer-executable components;
a processor that executes the computer-executable components stored in the memory, wherein the computer-executable components comprise:
a feedback component that receives feedback information for a user during a media presentation and regarding a mental state of the user during the media presentation;
a communication component that receives auxiliary information about a portion of content of the media presentation associated with reception of the feedback information wherein the auxiliary information comprises clarifying information about the portion of the content based on the feedback information indicating the mental state of the user comprises a state of confusion; and
a rendering component that renders the auxiliary information on a display of the device during the media presentation and based on the portion of content.

11. The device of claim 10, wherein the auxiliary information comprises supplementary information about the portion of content based on the feedback information indicating the mental state of the user comprises a state of intrigue.

12. The device of claim 10, wherein the feedback component monitors the mental state of the user based on reception and analysis of feedback information identifying one or more facial expressions of the user.

13. The device of claim 10, wherein the rendering component further renders at least a visual component of the media presentation on the display of the device and renders the auxiliary information concurrent with the visual component of the media presentation and based on the portion of content.

14. The device of claim 10, wherein the device comprises a head-mounted display that is worn by the user.

15. The device of claim 10, wherein the auxiliary information comprises content determined appropriate for the user based on a learning style of the user.

16. A computer-implemented method, comprising:
determining, by a device operatively coupled to a processor, feedback information for a user in response to a media presentation, wherein the feedback information is indicative of a mental state of the user during presentation of the media presentation at a user device associated with the user;
determining, by the device, content of the media presentation associated with the mental state of the user;
determining, by the device, auxiliary information about the content based on the mental state of the user, wherein the determining the auxiliary information comprises determining clarifying information about the content based on the mental state of the user being a state of confusion; and
providing, by the device, the auxiliary information to the user device during the presentation of the media presentation and for rendering at the user device in association with presentation of the content.

17. The computer-implemented method of claim 16, wherein the determining the auxiliary information further comprises:
determining supplementary information about the content based on the mental state of the user being a state of intrigue.

18. The computer-implemented method of claim 16, wherein the feedback information comprises information associated with one or more facial expressions indicative of the mental state of the user during presentation of the content of the media presentation.

19. The computer-implemented method of claim 16, wherein the determining the content comprises:
accessing an auxiliary information index comprising one or more auxiliary information entries associating different auxiliary information with different content of the presentation and different mental states; and
employing the auxiliary information index to select the auxiliary information about the content, thereby facilitating improved processing time for selection and provision of the auxiliary information to the user device during the presentation of the media presentation.

20. The computer-implemented method of claim 16, wherein the determining the auxiliary information further comprises:
determining a type of the auxiliary information based on a learning style of the user.

* * * * *